US 9,151,964 B2

(12) United States Patent
Takei et al.

(10) Patent No.: US 9,151,964 B2
(45) Date of Patent: Oct. 6, 2015

(54) OPTICAL UNIT WITH SHAKE CORRECTING FUNCTION

(75) Inventors: Yuichi Takei, Nagano (JP); Yoshihiro Hamada, Nagano (JP); Katsushige Yanagisawa, Nagano (JP)

(73) Assignee: NIDEC SANKYO CORPORATION (JP)

( * ) Notice: Subject to any disclaimer, the term of this patent is extended or adjusted under 35 U.S.C. 154(b) by 43 days.

(21) Appl. No.: 13/821,374

(22) PCT Filed: Aug. 31, 2011

(86) PCT No.: PCT/JP2011/069809
§ 371 (c)(1),
(2), (4) Date: Mar. 7, 2013

(87) PCT Pub. No.: WO2012/032989
PCT Pub. Date: Mar. 15, 2012

(65) Prior Publication Data
US 2013/0163974 A1 Jun. 27, 2013

(30) Foreign Application Priority Data

Sep. 7, 2010 (JP) .................. 2010-199534
Jun. 23, 2011 (JP) .................. 2011-139925

(51) Int. Cl.
*G03B 13/00* (2006.01)
*G02B 27/64* (2006.01)
*G03B 5/00* (2006.01)

(52) U.S. Cl.
CPC *G02B 27/64* (2013.01); *G03B 5/00* (2013.01); *G03B 2205/0007* (2013.01); *G03B 2205/0069* (2013.01)

(58) Field of Classification Search
CPC ... G03B 2217/005; G03B 13/00; G03B 13/32
USPC .......................................................... 396/55
See application file for complete search history.

(56) References Cited

U.S. PATENT DOCUMENTS

2010/0091120 A1* 4/2010 Nagata et al. .............. 348/208.4

FOREIGN PATENT DOCUMENTS

| JP | 2009-294393 A | 12/2009 |
| JP | 2010-117708 A | 5/2010 |
| JP | 2010-122662 A | 6/2010 |
| WO | 2010/044223 A1 | 4/2010 |

OTHER PUBLICATIONS

International Search Report for International application No. PCT/JP2011/069809, mailed Oct. 4, 2011, with English translation.

* cited by examiner

*Primary Examiner* — Clayton E Laballe
*Assistant Examiner* — Fang-Chi Chang
(74) *Attorney, Agent, or Firm* — Cantor Colburn LLP

(57) ABSTRACT

An optical unit with a shake correcting function may include a movable body configured to hold an optical element; a fixed body which covers at least a side face part of the movable body; a spring member which is connected with the movable body and the fixed body; a shake correction drive mechanism configured to generate a drive force for swinging the movable body with respect to the fixed body; and a stopper mechanism which is provided between the spring member and a swing center of the movable body in an optical axis direction, and configured to determine a movable range of the movable body in a direction perpendicular to the optical axis direction.

17 Claims, 21 Drawing Sheets

OPTICAL UNIT WITH SHAKE CORRECTING FUNCTION

CROSS REFERENCE TO RELATED APPLICATIONS

This is a U.S. national stage of International Application No. PCT/JP2011/069809, filed on Aug. 31, 2011. Priority under 35 U.S.C. §119(a) and 35 U.S.C. §365(b) is claimed from Japanese Applications No. 2010-199534, filed Sep. 7, 2010, and 2011-139925, filed Jun. 23, 2011, the disclosures of which are also incorporated herein by reference.

TECHNICAL FIELD

The present invention relates to an optical unit with a shake correcting function which is mounted on a cell phone with a camera or the like.

BACKGROUND

In recent years, a cell phone is structured as an optical device on which an optical unit for photographing is mounted. The optical unit for photographing includes a movable body having a lens, a lens drive mechanism for focusing which magnetically drives the movable body in an optical axis direction, and a photographing unit in which an imaging element is supported on a support body. In order to restrain disturbance of a photographed image due to a shake in hand of a user in the optical unit, a structure has been proposed in which a photographing unit is structured as a movable body that is capable of being swung on a fixed body and a shake correction drive mechanism is provided between the photographing unit (movable body) and the fixed body. Further, in order to structure that the photographing unit is capable of being swung on the fixed body, a structure has been proposed in which a swing support point is provided on a bottom part of the photographing unit and a spring member is connected with the photographing unit and the fixed body (see Patent Literatures 1 and 2).

PATENT LITERATURE

[PTL 1] Japanese Patent Laid-Open No. 2009-294393
[PTL 2] Japanese Patent Laid-Open No. 2010-117708

However, in the structure that the movable body is swingably supported by the spring member, when the movable body is displaced in a direction intersecting the optical axis due to an impact from the outside, the spring member may be plastically deformed to cause malfunction in succeeding operations.

The problem is not limited in a case that a shake in hand is corrected in an optical unit for photographing and may be a common problem for correcting a shake in an optical unit.

SUMMARY

In view of the problem described above, at least an embodiment of the present invention is to provide an optical unit with a shake correcting function which is capable of preventing plastic deformation of the spring member even when the movable body and the fixed body are connected with each other through the spring member.

In order to attain the above, at least an embodiment of the present invention provides an optical unit with a shake correcting function including a movable body which holds an optical element, a fixed body which covers at least a side face part of the movable body, a spring member which is connected with the movable body and the fixed body, a shake correction drive mechanism which generates a drive force for swinging the movable body with respect to the fixed body, and a stopper mechanism which is provided between the spring member and a swing center of the movable body in an optical axis direction for determining a movable range of the movable body in a direction perpendicular to the optical axis direction.

In the optical unit with a shake correcting function (optical unit) in accordance with at least an embodiment of the present invention, the movable body is supported by the spring member so as to be capable of being swung with respect to the fixed body and thus, when the shake correction drive mechanism is operated, the movable body is swung. Therefore, even when a shake occurs in the optical unit due to a shake in hand or the like, the shake is corrected by swinging of the movable body. Further, in at least an embodiment of the present invention, the stopper mechanism which determines a movable range of the movable body in a direction perpendicular to the optical axis direction is provided between the spring member and the swing center of the movable body in the optical axis direction. Therefore, even when the movable body is displaced in a direction intersecting the optical axis due to an impact from the outside, the movable body is not displaced large. Accordingly, a problem is prevented that the spring member is plastically deformed to cause malfunction in succeeding operations. Further, the stopper mechanism is provided between the spring member and the swing center of the movable body in the optical axis direction and thus, when the movable body is swung, the movable range is determined in a range where a displaced amount of the movable body is small. Therefore, even when the movable range of the movable body in a direction perpendicular to the optical axis direction is set narrow, the movable body is swung properly. Accordingly, a gap space between the movable body side and the fixed body side in the stopper mechanism can be set narrow and thus the size of the optical unit can be reduced suitably.

In at least an embodiment of the present invention, it is preferable that a swing support point which structures the swing center of the movable body is provided between a rear side end part in the optical axis direction of the movable body and a bottom plate portion of the fixed body which faces the rear side end part of the movable body on a rear side in the optical axis direction. According to this structure, the swing center of the movable body is determined unambiguously.

In at least an embodiment of the present invention, it is preferable that the stopper mechanism is comprised of a stopper member which is fixed to one of the fixed body and the movable body so as to protrude toward the other side. According to this structure, the movable range of the movable body is appropriately set by adjusting a fixed position of the stopper member.

In at least an embodiment of the present invention, it is preferable that the stopper member and a member to which the stopper member is fixed are made of the same metal material and are fixed to each other by welding. According to this structure, the stopper member is fixed surely.

In at least an embodiment of the present invention, it is preferable that an outer peripheral face of the movable body and an inner peripheral face of the fixed body are formed in a quadrangular shape when viewed in the optical axis direction, and the stopper member is provided at least at two diagonal positions of the quadrangular shape. According to this structure, the stopper member is provided by utilizing the corner portion, i.e., a vacant area. Further, when the stopper member is provided at two diagonal positions of a quadrangular shape, a movable range in all directions of the movable body is determined by the stopper mechanism provided at minimum positions.

In at least an embodiment of the present invention, it is preferable that the stopper member is formed in an "L"-shape which is extended from diagonal positions of a quadrangular shape to both sides along the side parts of the quadrangular shape. According to this structure, a movable range in all directions of the movable body is determined by two stopper members.

In at least an embodiment of the present invention, it may be structured that the stopper member is formed in a rectangular frame shape provided with four sides which are extended along an outer peripheral face of the movable body and an inner peripheral face of the fixed body. According to this structure, a movable range of the movable body in a direction perpendicular to the optical axis direction is determined surely. Therefore, even when the movable body is displaced in a direction intersecting the optical axis due to an impact from the outside, the movable body is not displaced large and thus a problem is prevented that the spring member is plastically deformed to cause malfunction in succeeding operations.

In this case, it is preferable that side plate parts of the fixing member facing at least two of the four sides are formed with a cut-out portion at a position facing an outer peripheral face of the side of the stopper member, the stopper member is provided with a fixing protruded part which is protruded from the side and is fitted to the cut-out portion, and the stopper member is fixed to the fixed body by welding the fixing protruded part with an inner edge of the cut-out portion. According to this structure, the position of the stopper member is determined with two side plate parts of the fixing member as a reference.

In at least an embodiment of the present invention, it is preferable that the fixing protruded part is welded to the inner edge of the cut-out portion by utilizing a thickness of the side plate part. According to this structure, an outer shape dimension of the optical unit with a shake correcting function is prevented from becoming large.

In at least an embodiment of the present invention, it is preferable that the fixing protruded part is provided at a center in a length direction of each of the two sides. According to this structure, the position of the stopper member is determined surely.

In at least an embodiment of the present invention, it is preferable that the spring member is provided with a fixed body side connecting part which is connected with the fixed body at a position adjacent to the stopper member on a front side in the optical axis direction, arm parts which are extended in an "L"-shape along two of four sides from the fixed body side connecting part, and a movable body side connecting part which is connected with a tip end part of the arm part and is connected with the movable body, and connected portions of the arm parts with the movable body side connecting part and connected portions of the arm parts with the fixed body side connecting part are respectively located at centers of the four sides, and a penetration part or a recessed part is formed in the stopper member at a position overlapped with the connected portion of the arm part with the fixed body side connecting part in the optical axis direction. According to this structure, the arm part and the stopper member are prevented from interfering with each other and the spring constant of the spring member is prevented from varying.

In at least an embodiment of the present invention, it is preferable that a projection which is projected toward a front side in the optical axis direction is provided in the stopper member at a position overlapped with a portion adjacent to the connected portion of the arm part with the movable body side connecting part. According to this structure, the movable body side connecting part is prevented from being excessively displaced to the rear side in the optical axis direction.

In at least an embodiment of the present invention, it is preferable that the stopper member is provided with a mark for distinguishing its face on a front side in the optical axis direction from its face on a rear side in the optical axis direction. According to this structure, the stopper member is prevented from being mounted in a reverse direction.

In at least an embodiment of the present invention, it is preferable that the stopper member is fixed to the fixed body. According to this structure, in comparison with a case that the stopper member is fixed to the movable body, the weight of the movable body is reduced. Therefore, a large torque is not required for swinging the movable body and thus the size of the shake correction drive mechanism can be reduced and, even when the size of the shake correction drive mechanism is relatively small, the swing of the movable body is performed for correcting a shake of the optical unit with a high degree of responsiveness.

In the optical unit with a shake correcting function (optical unit) in accordance with at least an embodiment of the present invention, the stopper mechanism which determines a movable range of the movable body in a direction perpendicular to the optical axis direction is provided between the spring member and the swing center of the movable body in the optical axis direction. Therefore, even when the movable body is displaced in a direction intersecting the optical axis due to an impact from the outside, the movable body is not displaced large. Accordingly, a problem is prevented that the spring member is plastically deformed to cause malfunction in succeeding operations. Further, the stopper mechanism is provided between the spring member and the swing center of the movable body in the optical axis direction and thus, when the movable body is swung, the movable range is determined in a range where a displaced amount of the movable body is small. Therefore, even when the movable range of the movable body in a direction perpendicular to the optical axis direction is set narrow, the movable body is swung properly. Accordingly, a gap space between the movable body side and the fixed body side in the stopper mechanism can be set narrow and thus the size of the optical unit can be reduced suitably.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

Embodiments of the present invention will be described below with reference to the accompanying drawings. In the following description, a structure for preventing a shake in hand in a photographing unit will be described. Further, in the following description, three directions perpendicular to each other are set to be an "X"-axis, a "Y"-axis and a "Z"-axis and a direction along an optical axis "L" (lens optical axis) is set to be the "Z"-axis. Further, in the following description, regarding swings of the respective directions, turning around the "X"-axis corresponds to a so-called pitching (vertical swing), turning around the "Y"-axis corresponds to a so-called yawing (lateral swing), and turning around the "Z"-axis corresponds to a so-called rolling. Further, "+X" indicates one side in the "X"-axis, "−X" indicates the other side, "+Y" indicates one side in the "Y"-axis, "−Y" indicates the other side, "+Z" indicates one side (opposite side to an object side/rear side in the optical axis direction) in the "Z"-axis, and "−Z" indicates the other side (object side/front side in the optical axis direction).

[Structure of Optical Unit for Photographing]
(Entire Structure)

Figure 1:
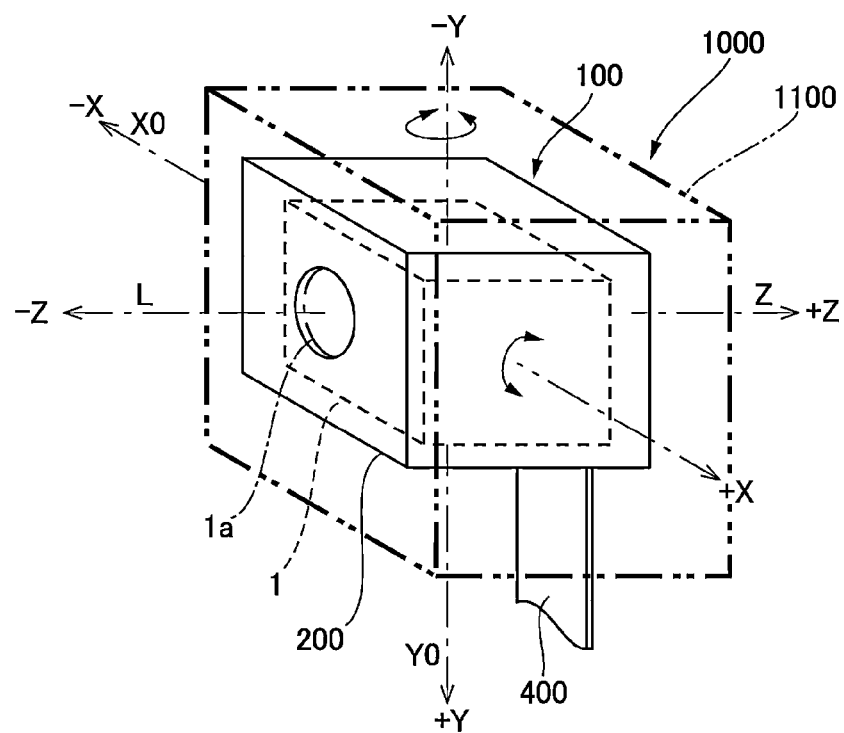
FIG. 1 is an explanatory view schematically showing an optical unit with a shake correcting function to which at least an embodiment of the present invention is applied and which is mounted on an optical device such as a cell phone.
Figure 2A:
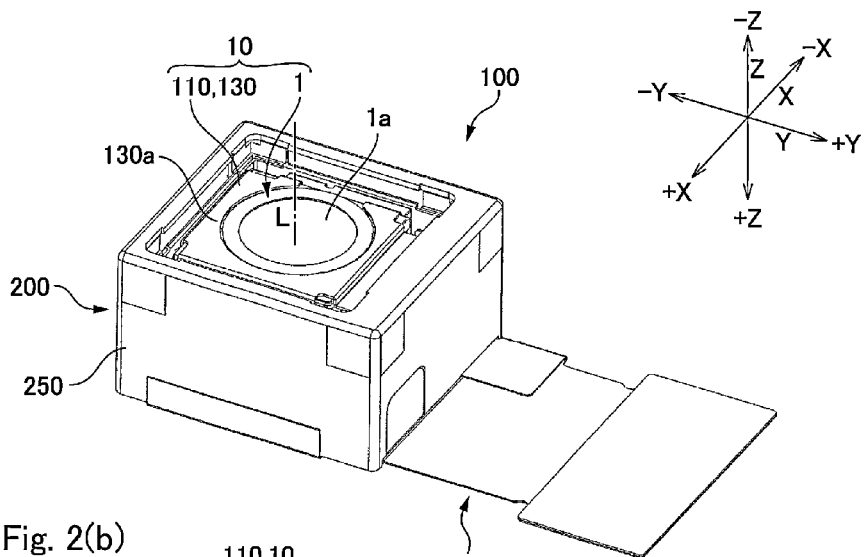
FIGS. 2(a) and 2(b) are perspective views showing an outward appearance of an optical unit with a shake correcting function to which at least an embodiment of the present invention is applied.
Figure 2B:
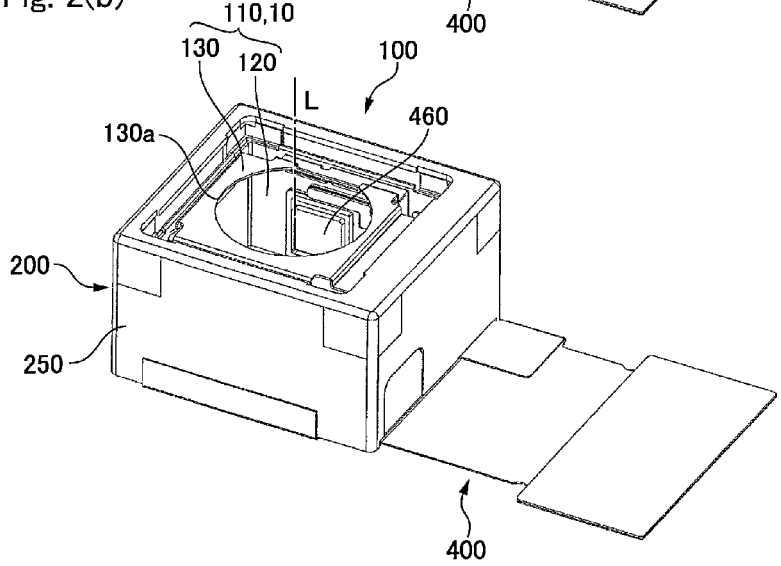

FIG. 1 is an explanatory view schematically showing an optical unit with a shake correcting function to which at least an embodiment of the present invention is applied and which is mounted on an optical device such as a cell phone. FIGS. 2(a) and 2(b) are perspective views showing an outward appearance and the like of an optical unit with a shake correcting function to which at least an embodiment of the present invention is applied. FIG. 2(a) is a perspective view showing an optical unit which is viewed from an object side and FIG. 2(b) is a perspective view showing a state in which a photographing unit is detached from the optical unit.

An optical unit 100 (optical unit with a shake correcting function) shown in FIG. 1 is a thin camera used in an optical device 1000 such as a cell phone with a camera and is mounted in a supported state by a chassis 1100 (device main body) of the optical device 1000. In the optical unit 100, when a shake such as a shake in hand is occurred in the optical device 1000 at the time of photographing, disturbance occurs in a photographed image. Therefore, in the optical unit 100 in this embodiment, as described below, a movable body 3 including a photographing unit 1 is supported in an inside of a fixed body 200 so as to be capable of swinging and the optical unit 100 is provided with a shake correction drive mechanism (not shown in FIG. 1) which swings the photographing unit 1 on the basis of a detection result for a shake in hand by a gyroscope (see FIG. 4 and the like) mounted on the optical unit 100 or a gyroscope or the like mounted on a main body side of the optical device 1000.

As shown in FIG. 1 and FIGS. 2(a) and 2(b), a flexible circuit board 400 is extended out from the optical unit 100 for supplying power to the photographing unit 1 and the shake correction drive mechanism. The flexible circuit board 400 is electrically connected with a host control section or the like which is provided in a main body of the optical device 1000.

Further, the flexible circuit board 400 is also provided with a function for outputting a signal from the photographing unit 1.

(Structure of Photographing Unit 1)

Figure 3:
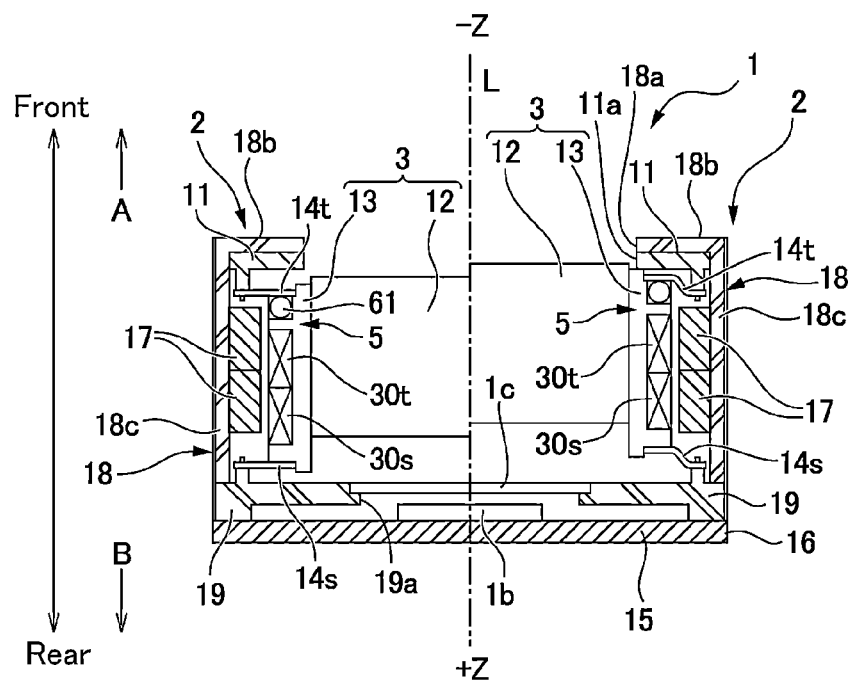
FIG. 3 is a cross-sectional view schematically showing a structure of a photographing unit which is mounted on an optical unit with a shake correcting function to which at least an embodiment of the present invention is applied.

FIG. 3 is a cross-sectional view schematically showing a structure of the photographing unit 1 which is mounted on the optical unit 100 with a shake correcting function to which at least an embodiment of the present invention is applied.

As shown in FIG. 3, the photographing unit 1 is, for example, an optical element unit which moves a plurality of lenses 1a as an optical element (see FIG. 1) in both directions, i.e., in an "A"-direction (front side) approaching an object to be photographed (object side) along an optical axis "L" direction and in a "B"-direction (rear side) approaching an opposite side (imaging element side/image side) to the object to be photographed. The photographing unit 1 is formed in a substantially rectangular prism shape. The photographing unit 1 generally includes a movable body 3 which holds optical elements such as a plurality of the lenses 1a (see FIG. 1) and a fixed diaphragm on its inner side, a magnetic drive mechanism 5 for moving the movable body 3 along the optical axis "L" direction, and a support body 2 on which the magnetic drive mechanism 5, the movable body 3 and the like are mounted. The movable body 3 is provided with a lens holder 12 in a cylindrical tube shape which holds the lenses 1a and the fixed diaphragm (not shown) and a coil holder 13 which holds the lens holder 12 on its inner side. Lens drive coils 30s and 30t structuring the lens drive mechanism 5 are held on an outer peripheral side face of the coil holder 13.

The support body 2 includes a spring holder 19 which holds a spring described below on an opposite side to an object side ("−Z" side), a circuit board holder 16 in a rectangular plate shape which positions a circuit board 15 on an opposite side ("+Z" side) to the object side ("−Z" side) with respect to the spring holder 19, a unit case 18 in a box shape which is fitted to the spring holder 19 from the object side, and a spacer 11 in a rectangular plate shape which is disposed on an inner side of the unit case 18. An imaging element 1b is mounted on a circuit board face of the circuit board 15 which is directed to the object side. Further, a filter 1c such as an infrared filter is held on the spring holder 19. Incident windows 11a and 18a for taking light from an object to be photographed into the lenses 1a are respectively formed at the centers of the spacer 11 and the unit case 18. Further, windows 16a and 19a for guiding the incident light to the imaging element 1b are formed at the centers of the circuit board holder 16 and the spring holder 19.

The unit case 18 is made of a ferromagnetic plate such as a steel plate and functions as a yoke. Therefore, the unit case 18 structures an interlinkage magnetic field generating body together with lens drive magnets 17 described below for generating a magnetic field interlinking with the lens drive coils 30s and 30t. The interlinkage magnetic field generating body structures the lens drive mechanism 5 together with the lens drive coils 30s and 30t which are wound around an outer peripheral face of the coil holder 13.

The support body 2 and the movable body 3 are connected with each other through metal spring members 14s and 14t which are disposed at separated positions in the optical axis direction. In this embodiment, the spring member 14s is used on the imaging element 1b side and the spring member 14t is used on an object to be photographed side. Basic structures of the spring members 14s and 14t are similar to each other and each of the spring members 14s and 14t is provided with an outer peripheral side connecting part which is held by the support body 2, a circular ring-shaped inner peripheral side connecting part which is held by the movable body 3, and arm parts having a thinner width which are connected with the outer peripheral side connecting part and the inner peripheral side connecting part. The outer peripheral side connecting part of the spring member 14s on the imaging element 1b side is held by the spring holder 19 and its inner peripheral side connecting part is connected with an imaging element side end part of the coil holder 13 of the movable body 3. The outer peripheral side connecting part of the spring member 14t on the object side is held by the spacer 11 and its inner peripheral side connecting part is connected with an object side end part of the coil holder 13 of the movable body 3. In this manner, the movable body 3 is supported by the support body 2 through the spring members 14s and 14t so as to be movable in the direction of the optical axis. Each of the spring members 14s and 14t is made of nonmagnetic metal such as beryllium copper or nonmagnetic SUS steel material and is formed by performing press working or etching processing using photo lithography technique on a thin plate having a certain thickness. The spring member 14s is divided into two spring pieces and respective coil ends of the lens drive coils 30s and 30t are connected with the respective spring pieces. Further, two spring pieces of the spring member 14s are connected with terminals and thus the spring member 14s functions also as a power supply member for the lens drive coils 30s and 30t.

A ring-shaped magnetic piece 61 is held at an object side end part of the coil holder 13 and the position of the magnetic piece 61 is held at a position on the object side with respect to the lens drive magnets 17. Therefore, the magnetic piece 61 applies an urging force in the direction of the optical axis "L" to the movable body 3 by an attraction force acted between the lens drive magnets 17 and the magnetic piece 61. Accordingly, at a non-energization time (home position), the lens holder 12 is set stationary on the imaging element 1b side by the attraction force between the lens drive magnets 17 and the magnetic piece 61. Further, the magnetic piece 61 acts as a yoke and thus a leakage flux from a magnetic path structured between the lens drive magnets 17 and the lens drive coils 30s and 30t can be reduced. The magnetic piece 61 may be formed in a bar shaped magnetic body or a spherical shaped magnetic body. In a case that the magnetic piece 61 is formed in a ring shape, when the lens holder 12 is to be moved in the optical axis direction, an attraction force acted between the lens drive magnets 17 and the magnetic piece 61 becomes isotropic. In addition, at the time of energization to the lens drive coils 30s and 30t, the magnetic piece 61 is moved in a direction separating from the lens drive magnets 17 and thus an unnecessary force pressing the lens holder 12 to the imaging element 1b side may not act. Therefore, the lens holder 12 can be moved in the optical axis direction with small electric power.

In the photographing unit 1 in this embodiment, when viewed in the direction of the optical axis "L", the lens 1a (see FIG. 1) is formed in a circular shape but the unit case 18 used in the support body 2 is formed in a rectangular box shape. Therefore, the unit case 18 is provided with a rectangular tube-shaped body part 18c and an upper plate part 18b formed with the incident window 18a is provided on an upper face side of the rectangular tube-shaped body part 18c. The lens drive magnets 17 are fixed to inner side face parts corresponding to the corners of a quadrangle of the rectangular tube-shaped body part 18c and the lens drive magnets 17 are respectively comprised of a triangular prism-shaped permanent magnet. Each of four lens drive magnets 17 is divided into two pieces in the direction of the optical axis and is magnetized so that a magnetic pole of its inner face and a magnetic pole of its outer face are different from each other. Therefore, winding directions of the two lens drive coils 30s and 30t around the coil holder 13 are opposite to each other.

The movable body 3 which is structured as described above is disposed on an inner side of the unit case 18. As a result, the lens drive coils 30s and 30t respectively face the lens drive magnets 17 which are fixed to the inner face of the rectangular tube-shaped body part 18c of the unit case 18 to structure the lens drive mechanism 5.

In the photographing unit 1 structured as described above, the movable body 3 is normally located on the imaging element side (one side in the "Z"-axis direction) and, in this state, when an electric current is supplied to the lens drive coils 30s and 30t in a predetermined direction, an electro-magnetic force directing to the object side (the other side in the "Z"-axis direction) is applied to the respective lens drive coils 30s and 30t. Therefore, the movable body 3 to which the lens drive coils 30s and 30t are fixed begins to move to the object side (front side). In this case, an elastic force restricting movement of the movable body 3 is generated between the spring member 14t and the front end of the movable body 3 and between the spring member 14s and the rear end of the movable body 3. Therefore, when the electro-magnetic force for moving the movable body 3 to the front side and the elastic force for restricting the movement of the movable body 3 are balanced with each other, the movable body 3 is stopped. In this case, when an amount of an electric current supplied to the lens drive coils 30s and 30t is adjusted depending on the elastic force acted on the movable body 3 by the spring members 14s and 14t, the movable body 3 can be stopped at a desired position.

(Schematic Structure of Optical Unit 100)

Figure 4:
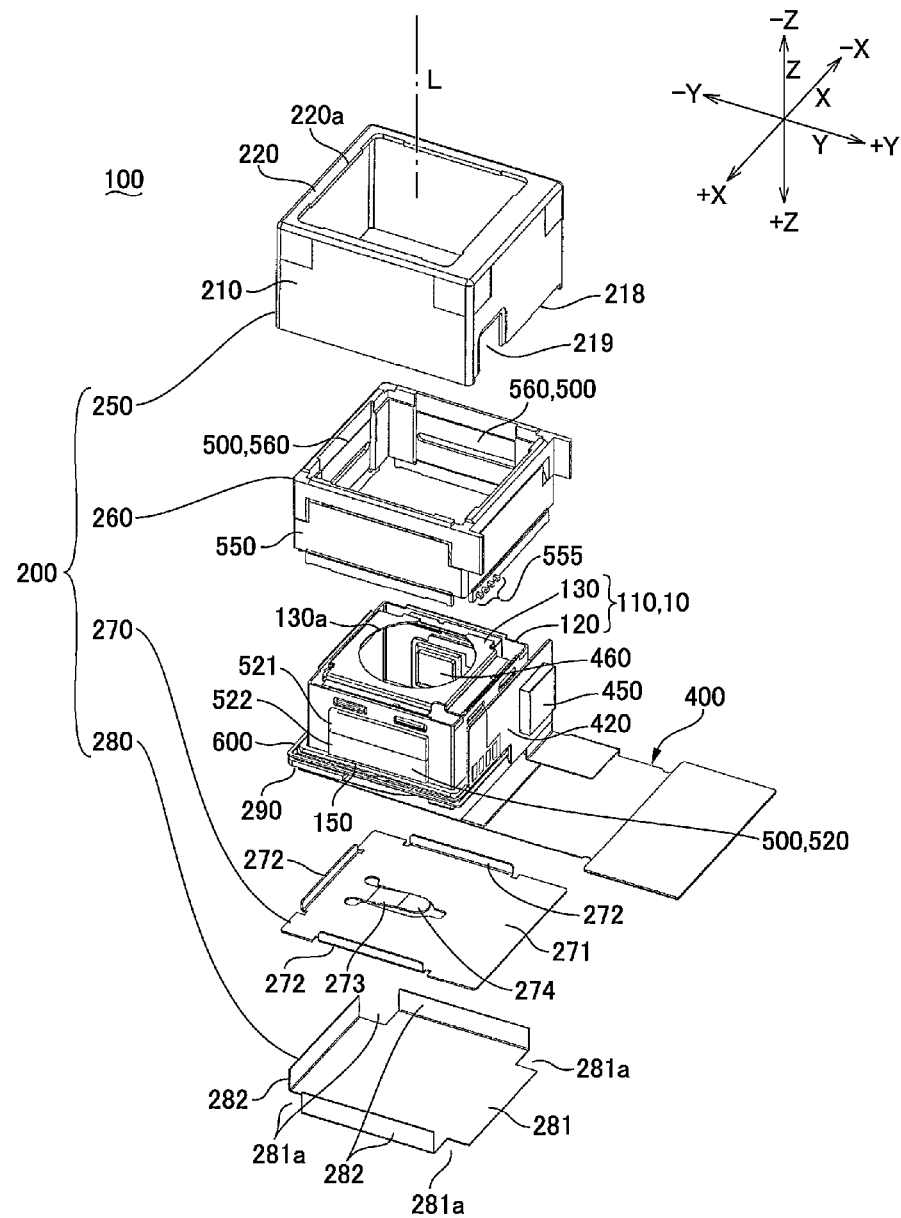
FIG. 4 is an exploded perspective view showing a structure of an optical unit with a shake correcting function to which at least an embodiment of the present invention is applied.
Figure 5:
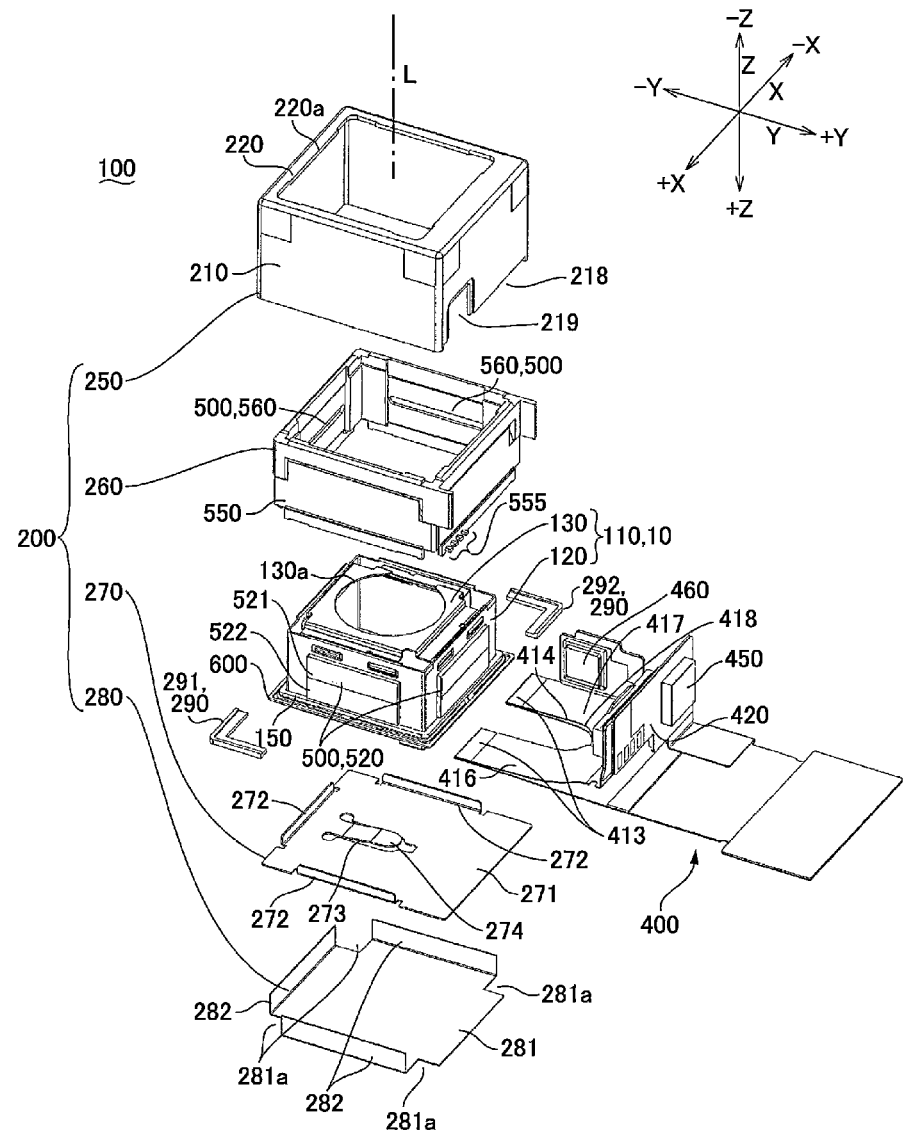
FIG. 5 is an exploded perspective view showing a further disassembled optical unit with a shake correcting function to which at least an embodiment of the present invention is applied.

FIG. 4 is an exploded perspective view showing a structure of the optical unit 100 with a shake correcting function to which at least an embodiment of the present invention is applied. FIG. 5 is an exploded perspective view showing a further disassembled optical unit 100 with a shake correcting function to which at least an embodiment of the present invention is applied. In FIGS. 4 and 5, the photographing unit 1 of the movable body 10 is not shown and only the cover 110 is shown.

In FIGS. 4 and 5, the optical unit 100 includes a fixed body 200, a movable body 10 in which the photographing unit 1 (see FIG. 3) is accommodated in an inside of the cover 110, a spring member 600 through which the movable body 10 is supported by the fixed body 200 so as to be capable of being displaced with respect to the fixed body 200, and a shake correction drive mechanism 500 which generates a magnetic drive force for relatively displacing the movable body 10 with respect to the fixed body 200 between the movable body 10 and the fixed body 200.

(Structure of Fixed Body 200)

Figure 6:
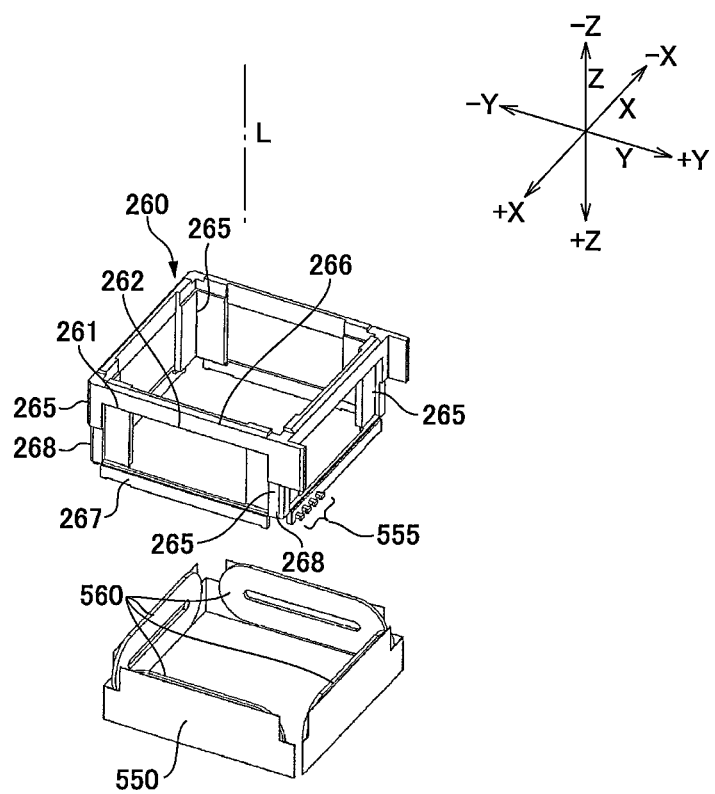
FIG. 6 is an explanatory view showing a coil holder and coils which are used in an optical unit with a shake correcting function to which at least an embodiment of the present invention is applied.

FIG. 6 is an explanatory view showing a coil holder and coils which are used in the optical unit 100 with a shake correcting function to which at least an embodiment of the present invention is applied.

As shown in FIGS. 4 and 5, the fixed body 200 includes a case 250, a coil holder 260, a bottom plate 270 and a seal cover 280. The case 250 is provided with a rectangular tube-shaped body part 210 which surrounds the movable body 10 and an end plate part 220 which closes an opening part on the object side of the rectangular tube-shaped body part 210. The end plate part 220 is formed with a window 220a through which light from an object to be photographed is incident. In the case 250, an end part on the opposite side ("+Z" side) to the object side (side to which the optical axis is extended) of the rectangular tube-shaped body part 210 is formed to be opened. Further, a cut-out portion 219 is formed in a side plate part located on one side "+Y" in the "Y"-axis direction of the rectangular tube-shaped body part 210. The cut-out portion 219 is utilized when the flexible circuit board 400 is to be connected with terminals 555. Further, a cut-out portion 218 is formed at a lower end edge of the side plate part located on one side "+Y" in the "Y"-axis direction of the rectangular tube-shaped body part 210. The cut-out portion 218 is utilized for extending the flexible circuit board 400 to an outer side.

As shown in FIG. 6, the coil holder 260 is formed in a substantially rectangular tube shape. Each of four side plate parts is formed with a recessed part 261 which is slightly recessed to an inner side from an outer side and a center portion of the recessed part 261 is formed with an opening part 262. Therefore, the coil holder 260 is provided with vertical frame portions 265 whose cross section is in an "L"-shape which is extended in the optical axis direction at four corner portions, upper frame portions 266 which connect the vertical frame portions 265 adjacent to each other on an upper end side in the optical axis direction, and lower frame portions 267 which connect the vertical frame portions 265 adjacent to each other on a lower end side in the optical axis direction. A recessed part 268 is formed in a lower half part of an outer face of the vertical frame portion 265. Further, the vertical frame portion 265 is protruded to an inner side with respect to the upper frame portion 266 and the lower frame portion 267. Further, four terminals 555 are held in the lower frame portion 267 located on the "+Y" side in the "Y"-axis direction.

A belt-shaped sheet 550 which holds four coils 560 is held in a coil holder 260. The coil 560 is formed in a quadrangular frame shape and its long side portions on upper and lower sides are utilized as an effective side. The sheet 550 is structured of a flexible circuit board and the coil 560 is electrically connected with the sheet 550. The sheet-shaped coil body may be structured by mounting the coils 560 on a flexible circuit board. Alternatively, a sheet-shaped coil may be adopted in which a coil part made of a minute copper wiring line is formed on a printed circuit board by utilizing an electric conduction wiring technique. For example, an FP coil (fine pattern coil (registered mark)) made by ASAHI KASEI ELECTRONICS CO., LTD. may be used as the sheet-shaped coil. A plurality of copper wiring layers (coil part) is formed in multi-layer through an insulation film. In a case of the sheet-shaped coil, different from an air-core coil, the winding does not loosen even when the winding is abutted with the permanent magnet 520 and the like.

The sheet 550 is fitted to the recessed parts 261 and 268 of the coil holder 260 when the sheet 550 is circumferentially bent along the coil holder 260 and, in this state, an upper side portion and a lower side portion of the coil 560 are exposed to an inner side from the opening part 262 of the coil holder 260. Further, the sheet 550 is electrically connected with a control IC 450 (see FIG. 4 and the like) which is mounted on the flexible circuit board 400 through a relaying flexible circuit board (not shown).

In FIGS. 4 and 5, the bottom plate 270 is a press-worked product of a metal plate. The bottom plate 270 is provided with a bottom plate part 271 in a substantially rectangular shape and three side plate parts 272 which stand up toward an object side from two sides facing each other in the "X"-axis direction of the outer circumferential edge of the bottom plate part 271 and a side located on the "−Y" side in the "Y"-axis direction. The side plate parts 272 are fixed to an inner face of the rectangular tube-shaped body part 210 of the case 250. A center portion of the bottom plate part 271 is formed with a plate spring part 273 which is obliquely cut and bent. The plate spring part 273 is bent at plural positions and a tip end part 274 of the plate spring part 273 is directed in a direction which is perpendicular to the optical axis.

The seal cover 280 is provided with a bottom plate part 281, which is superposed on the bottom plate part 271 of the bottom plate 270 on an opposite side to an object side, and three side plate parts 282 which stand up toward an object side from two sides facing each other in the "X"-axis direction and a side located on the "–Y" side in the "Y"-axis direction of the outer circumferential edge of the bottom plate part 281. The side plate part 282 is fixed to an outer face of the rectangular tube-shaped body part 210 of the case 250. A rectangular cut-out portion 281a is formed at four corner portions of the bottom plate part 281.

In this embodiment, in the case 250 which structures the tube-shaped body part of the fixed body 200, a stopper member 290 described below is fixed to two corner portions facing each other of the rectangular tube-shaped body part 210.

(Structure of Movable Body 10)

Figure 7A:
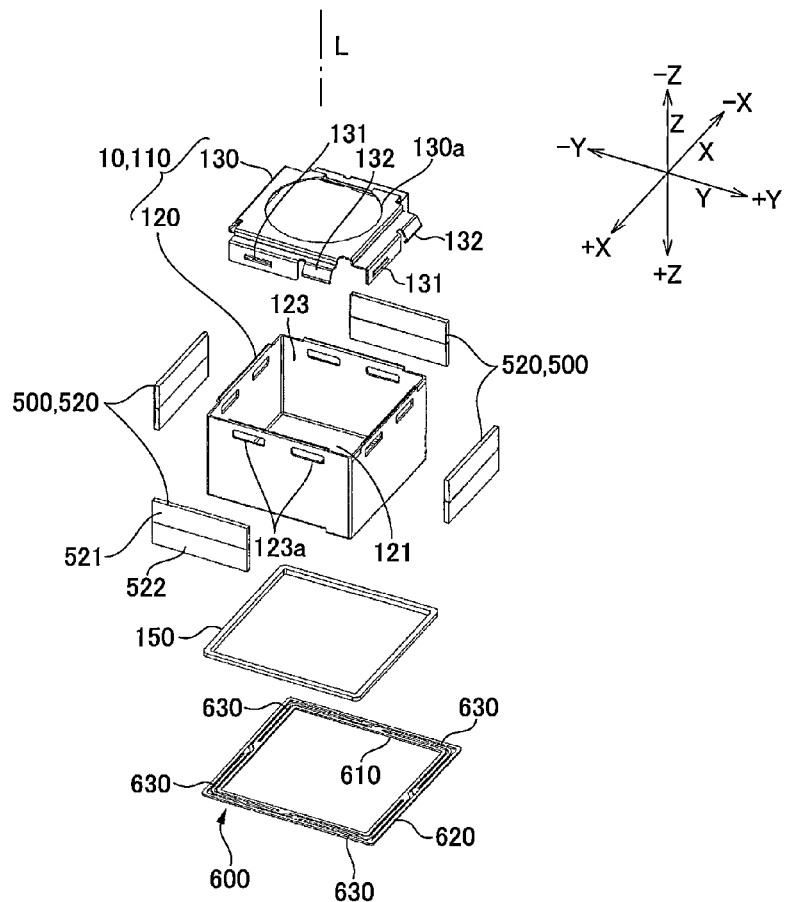
FIGS. 7(a) and 7(b) are explanatory views showing a movable body which is used in an optical unit with a shake correcting function to which at least an embodiment of the present invention is applied.
Figure 7B:
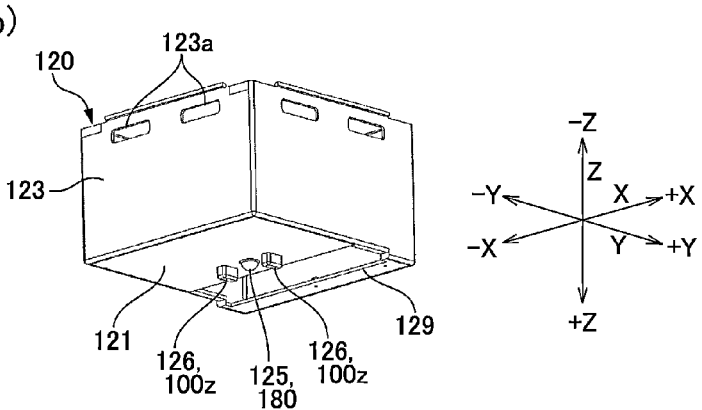

FIGS. 7(a) and 7(b) are explanatory views showing the movable body 10 which is used in the optical unit 100 with a shake correcting function to which at least an embodiment of the present invention is applied. FIG. 7(a) is an exploded perspective view showing the movable body 10 and FIG. 7(b) is an explanatory view showing a structure of a bottom part of the movable body 10.

As shown in FIG. 7(a), the movable body 10 includes the cover 110 which holds the photographing unit 1 on its inner side which is described with reference to FIG. 3 and the cover 110 structures an outer peripheral portion of the movable body 10. The cover 110 is structured of a bottomed tube-shaped cover 120 which covers a periphery of the photographing unit 1 and an upper cover 130 which covers an object side end face of the photographing unit 1. The tube-shaped cover 120 structures a side face part of the movable body 10. In this embodiment, the movable body 10 is formed in a rectangular parallelepiped shape and the tube-shaped cover 120 is formed in a rectangular tube shape and an upper cover 130 is formed in a roughly quadrangular shape. A hole 130a through which light from an object side is passed is formed in the upper cover 130.

The tube-shaped cover 120 is a press-worked product made of a metal plate and is provided with a rectangular tube part 123 and a bottom part 121. The rectangular tube part 123 is formed with holes 123a which engage with a protruded part 131 and a hook 132 of the upper cover 130. Therefore, when the upper cover 130 is fitted to the tube-shaped cover 120 after the photographing unit 1 is accommodated in the inside of the tube-shaped cover 120, the tube-shaped cover 120 and the upper cover 130 are automatically connected with each other.

As shown in FIG. 7(b), a bottom part 121 of the tube-shaped cover 120 is formed with a rectangular opening part 129 and is formed at a center portion with a protruded part 125 which is protruded toward an opposite side to an object side in a hemispherical shape and is abutted with a tip end part 274 of the plate spring part 273 described with reference to FIGS. 4 and 5. The protruded part 125 structures a swing support point 180 which is a swing center of the movable body 10. Therefore, the movable body 10 is capable of swinging with a portion (swing support point 180) located on one side "+Z" in the "Z"-axis (opposite side to an object side) as a swing center. Further, the bottom part 121 of the tube-shaped cover 120 is formed with protruded parts 126 which are protruded toward an opposite side to an object side at positions interposing the protruded part 125 on both sides in the "X"-axis direction. The protruded part 126 functions as a stopper mechanism 100z so that the protruded part 126 is abutted with the bottom plate 270 when the movable body 10 is displaced toward an opposite side to an object side due to an impact from the outside. Therefore, when the movable body 10 is displaced toward an opposite side to an object side due to an impact from the outside, the plate spring part 273 is not plastically deformed. The swing support point 180 may be structured of a hemispherical projection provided on a side of the bottom plate 270 or may be structured of a steel ball which is disposed between the bottom plate 270 and the movable body 10.

As shown in FIGS. 4, 5 and 7(a), a spring member 600 is connected with the tube-shaped cover 120. The spring member 600 is a plate-shaped spring member which is provided with a fixed body side connecting part 620 fixed to a lower end part of the coil holder 260 of the fixed body 200, a movable body side connecting part 610 connected with the movable body 10, and a plurality of arm parts 630 extended between the movable body side connecting part 610 and the fixed body side connecting part 620. Both ends of the arm part 630 are respectively connected with the movable body side connecting part 610 and the fixed body side connecting part 620. In this embodiment, the movable body side connecting part 610 and the fixed body side connecting part 620 are formed in a rectangular frame shape. The spring member 600 is made of nonmagnetic metal such as beryllium copper or nonmagnetic SUS steel material and is formed in a plate spring shape by performing a press working or etching processing using a photo lithography technique on a thin plate having a certain thickness.

In this embodiment, as described below, a connecting member 150 in a rectangular frame shape is fixed to an outer peripheral face of the tube-shaped cover 120 and the spring member 600 is fixed to the connecting member 150.

Further, a permanent magnet 520 structuring the shake correction drive mechanism 500 together with the coil 560, which is described with reference to FIGS. 4, 5 and 6, is fixed to each of four outer peripheral faces of the tube-shaped cover 120. The permanent magnet 520 is magnetized so that the pole of its outer side and the pole of its inner side are different from each other. Further, the permanent magnet 520 is comprised of two magnet pieces (first magnet piece 521 and second magnet piece 522) which are adjacent to each other in the optical axis direction and inner side poles of the two magnet pieces are different from each other.

(Structure of Flexible Circuit Board 400)

As shown in FIGS. 4 and 5, the optical unit 100 in this embodiment includes a flexible circuit board 400 connected with the movable body 10. A gyroscope 460 and a connector 470 (see FIG. 8(a)) are mounted on a portion of the flexible circuit board 400 which is located in an inside of the tube-shaped cover 120 of the movable body 10. Further, the flexible circuit board 400 is provided with a branch portion 420 which is fixed to the coil holder 260 and a control IC 450 and the like are mounted on the branch portion 420. The branch portion 420 is bent at plural positions and is disposed between the coil holder 260 and the case 250.

In this embodiment, when the flexible circuit board 400 applies a load to the movable body 10 at the time of swinging of the movable body 10, the movable body 10 may not be swung appropriately. Therefore, the flexible circuit board 400 is extended from one side "+Y" in the "Y"-axis direction connected with the movable body 10 to the other side "–Y" and then is folded back toward the side "+Y" and is extended out to an outer side. Accordingly, the flexible circuit board 400 is provided with a folded-back portion 413 between a portion connected with the movable body 10 and a portion extended out to the outer side and thus its dimension is long. As a result, the strip-shaped portion of the flexible circuit board 400 is capable of following a shake of the movable body 10 smoothly and thus a large load is not applied to the movable body 10. Further, the folded-back portion 413 of the flexible circuit board 400 is located at the same height position as the swing center of the movable body 10 in the swing support point 180 (abutting position of the protruded part 125 with the plate spring part 273 of the bottom plate 270). Therefore, when the movable body 10 is swung, the displacement of the flexible circuit board 400 is restrained small. Accordingly, affection of the flexible circuit board 400 applied to the movable body 10 is reduced and thus the movable body 10 is swung with a high degree of accuracy.

Further, the flexible circuit board 400 is formed at a midway portion in its length direction with a slit 418 which is extended along an extended direction ("Y"-axis direction) and the midway portion is divided into two thinner width portions 416 and 417. Therefore, the rigidity of the flexible circuit board 400 is relaxed. Accordingly, the flexible circuit board 400 is capable of following a shake of the movable body 10 smoothly and thus a large load is not applied to the movable body 10.

In this embodiment, the flexible circuit board 400 is superposed on the movable body 10 in the optical axis direction but the portion superposed on the swing support point 180 is formed with a circular hole 414 which is connected with the slit 418. Therefore, even when the flexible circuit board 400 is disposed at a position superposed on the movable body 10 in the optical axis direction, the swing support point 180 is provided without a problem.

(Structure of Shake Correction Drive Mechanism 500 and the Like)

Figure 8A:
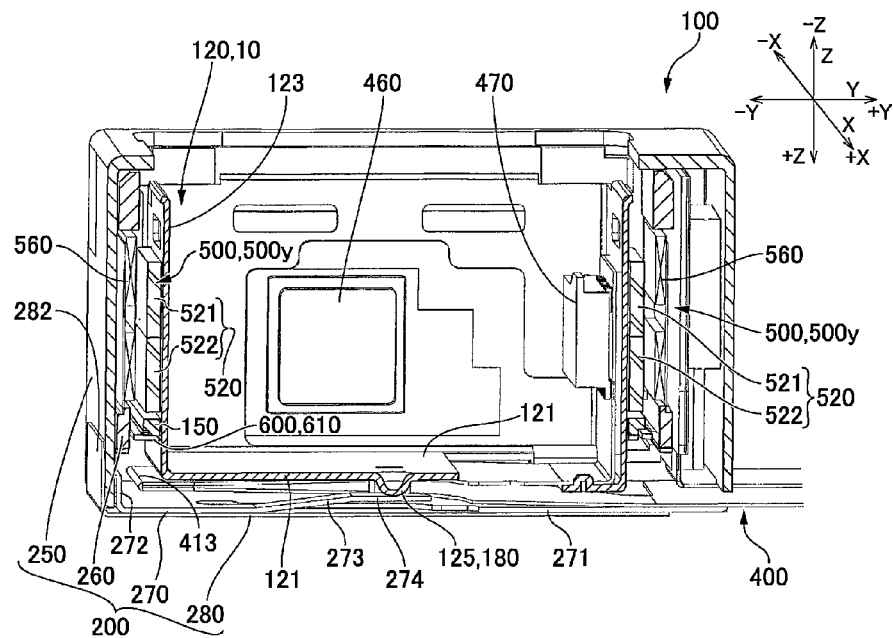
FIGS. 8(a) and 8(b) are "YZ" cross-sectional views showing an optical unit with a shake correcting function to which at least an embodiment of the present invention is applied.
Figure 8B:
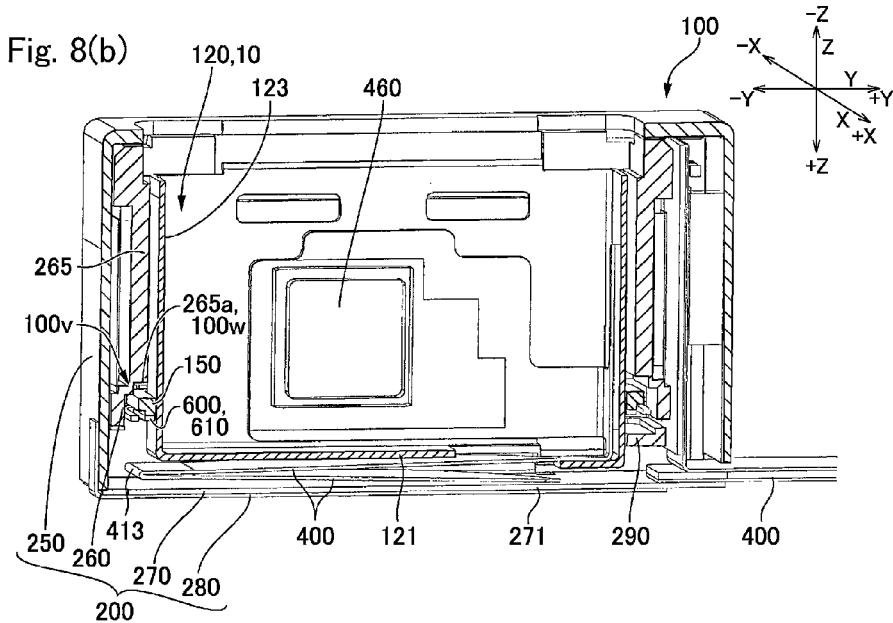
Figure 9:
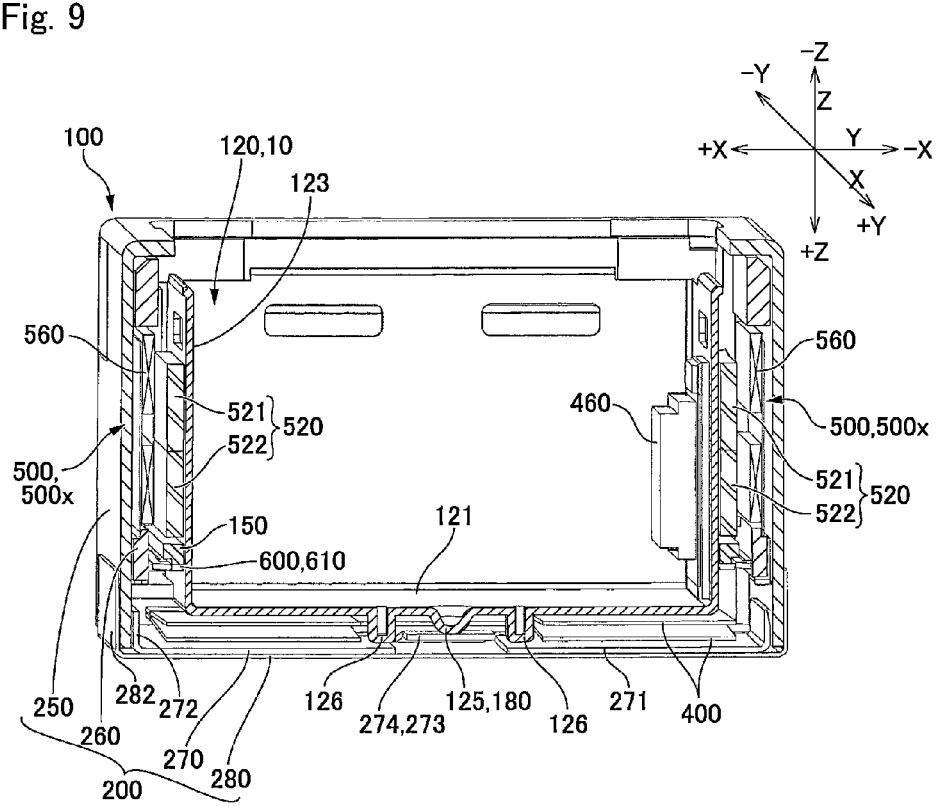
FIG. 9 is a "ZX" cross-sectional view showing an optical unit with a shake correcting function to which at least an embodiment of the present invention is applied.
Figure 10:
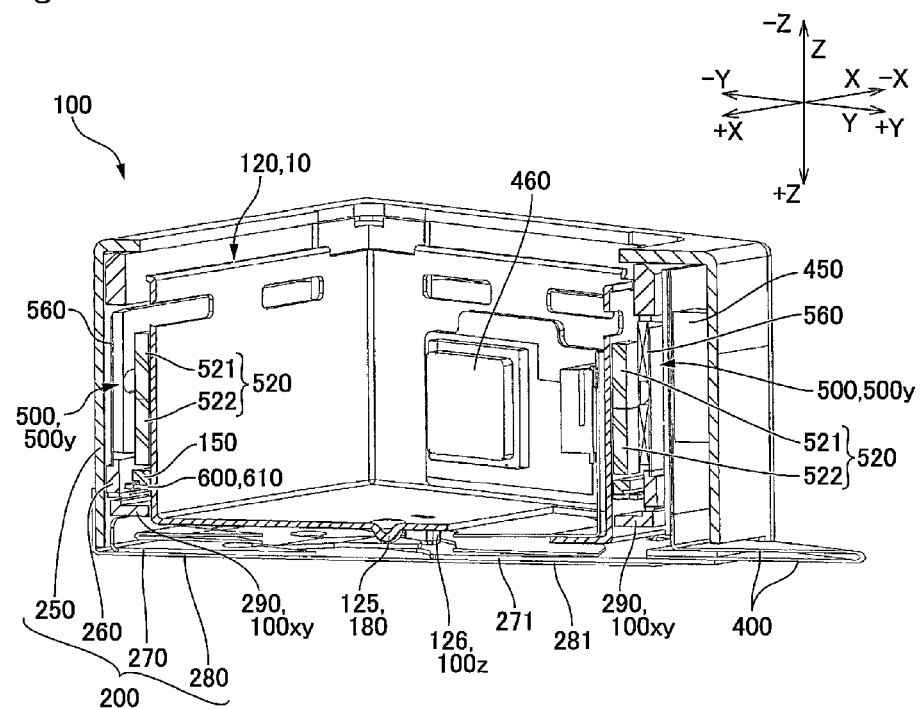
FIG. 10 is a cross-sectional view showing an optical unit with a shake correcting function to which at least an embodiment of the present invention is applied and which is cut off at a position passing its corner parts.
Figure 11A:
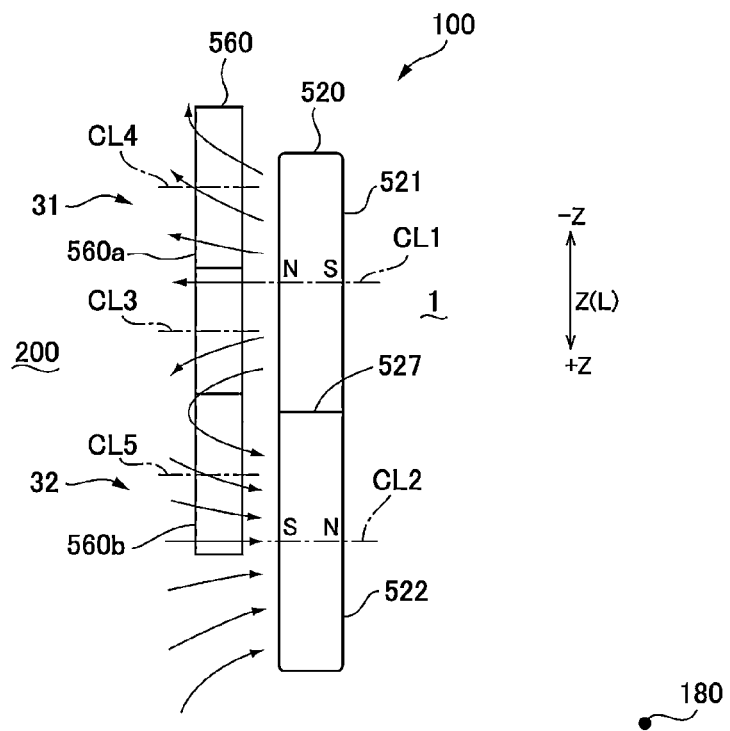
FIGS. 11(a) and 11(b) are explanatory views showing a shake correction drive mechanism of an optical unit with a shake correcting function to which at least an embodiment of the present invention is applied.
Figure 11B:
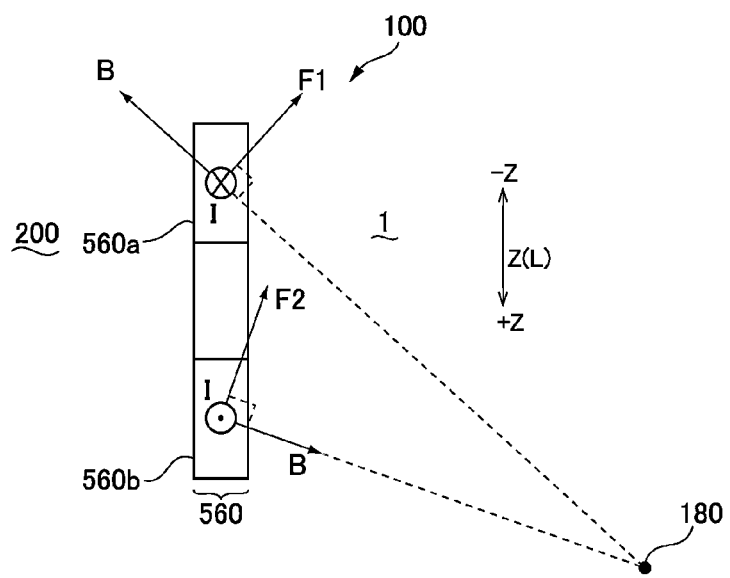

FIGS. 8(a) and 8(b) are "YZ" cross-sectional views showing the optical unit 100 with a shake correcting function to which at least an embodiment of the present invention is applied. FIG. 8(a) is a "YZ" cross-sectional view showing the optical unit 100 which is cut off at a substantially center position in the "X"-axis direction and FIG. 8(b) is a "YZ" cross-sectional view showing the optical unit 100 which is cut off at a position displaced from the center position in the "X"-axis direction. FIG. 9 is a "ZX" cross-sectional view showing the optical unit 100 with a shake correcting function to which at least an embodiment of the present invention is applied. FIG. 10 is a cross-sectional view showing the optical unit 100 with a shake correcting function to which at least an embodiment of the present invention is applied and which is cut off at a position passing its corner parts. FIGS. 11(a) and 11(b) are explanatory views showing a shake correction drive mechanism 500 of the optical unit 100 with a shake correcting function to which at least an embodiment of the present invention is applied. In the movable body 10 in FIGS. 8(a) through 10, the photographing unit 1 and the upper cover 130 are not shown and only the tube-shaped cover 120 is shown.

As shown in FIGS. 8(a) through 10, when the movable body 10 is incorporated into an inside of the fixed body 200, the protruded part 125 of the movable body 10 is abutted with the tip end part 274 of the plate spring part 273 which is formed in the bottom plate 270 to structure the swing support point 180. In this case, the movable body side connecting part 610 of the spring member 600 is in a state that the movable body side connecting part 610 is pushed up to an object side with respect to the fixed body side connecting part 620 and the arm parts 630 of the spring member 600 urge the movable body 10 to an opposite side to the object side. Therefore, the protruded part 125 of the movable body 10 is resiliently abutted with the tip end part 274 of the plate spring part 273 which is formed in the bottom plate 270 and the movable body 10 is supported by the fixed body 200 in a swingable state through the swing support point 180.

Further, as shown in FIG. 8(a), in the permanent magnets 520 on the movable body 10 side and the coils 560 on the fixed body 200 side, the permanent magnets 520 and the coils 560 disposed at two positions so as to interpose the movable body 10 from both sides in the "Y"-axis direction structure a "Y"-side shake correction drive mechanism 500y (shake correction drive mechanism 500). The movable body 10 is swung with an axial line extending in the "X"-axis direction passing through the swing support point 180 as a swing center.

On the other hand, as shown in FIG. 9, the permanent magnets 520 and the coils 560 disposed at two positions so as to interpose the movable body 10 from both sides in the "X"-axis direction structure an "X"-side shake correction drive mechanism 500x (shake correction drive mechanism 500). The movable body 10 is swung with an axial line extending in the "Y"-axis direction passing through the swing support point 180 as a swing center.

Therefore, in the optical unit 100 in this embodiment, when the optical device 1000 shown in FIG. 1 is shaken, the shake is detected by a gyroscope and a control IC 450 controls the shake correction drive mechanism 500. In other words, the control IC 450 supplies a drive current for cancelling the shake which is detected by the gyroscope to the coils 560. As a result, the "X"-side shake correction drive mechanism 500x swings the photographing unit 1 around the "Y"-axis with the swing support point 180 as a swing center. Further, the "Y"-side shake correction drive mechanism 500y swings the photographing unit 1 around the "X"-axis with the swing support point 180 as the swing center. Further, when the swing around the "X"-axis and the swing around the "Y"-axis of the photographing unit 1 are combined with each other, the photographing unit 1 is displaced over the entire "XY" plane. Accordingly, all shakes occurred in the optical unit 100 can be corrected surely.

In the shake correction drive mechanism 500, as shown in FIG. 11(a), the coil 560 and the permanent magnet 520 are faced each other and upper and lower long side portions of the coil 560 are utilized as an effective side. In this embodiment, the permanent magnet 520 is structured of a first magnet piece 521 and a second magnet piece 522 which are disposed in the optical axis direction, and their magnetic poles located on the coil 560 side are magnetized so as to be different from each other. Therefore, magnetic lines of force generated from the permanent magnet 520 are, for example, formed so as to be shown by the arrows in FIG. 11(a). Accordingly, on the object side in the optical axis "L" direction with respect to the center "CL1" of the first magnet piece 521, a first region 31 is formed in which the directions of the magnetic lines of force from the first magnet piece 521 are set in directions substantially going away from the swing support point 180 (see FIGS. 8(a) and 9). On the other hand, on the object side in the optical axis "L" direction with respect to the center "CL2" of the second magnet piece 522, a second region 32 is formed in which the directions of the magnetic lines of force of the second magnet piece 522 are set in directions substantially going toward the swing support point 180.

In this embodiment, the permanent magnet 520 and the coil 560 are oppositely disposed to each other so that the center "CL3" of the coil 560 in the optical axis direction is disposed on an upper side with respect to the abutting face 527 of the first magnet piece 521 with the second magnet piece 521. In other words, the center "CL3" of the coil 560 is disposed on the object side which is away from the swing support point 180 in the optical axis direction with respect to the abutting face 527 which is the magnetic center of the permanent magnet 520. Therefore, the center "CL4" of the long side part 560a of the coil 560 is disposed on the object side with respect to the center "CL1", which is the magnetic center of the first magnet piece 521, and the center "CL5" of the long side part 560b is disposed on the object side with respect to the center "CL2" which is the magnetic center of the second magnet piece 521. In other words, the long side part 560a is disposed in the first region 31 and the long side part 560b is disposed in the second region 32.

Therefore, as shown in FIG. 11(b), a direction of the electro-magnetic force "F1" generated in the long side part 560a by supplying an electric current to the coil 560 is substantially coincided with a tangential direction of a circle whose center is the swing support point 180 and which passes the long side part 560a. Further, a direction of the electro-magnetic force "F2" generated in the long side part 560b by supplying an electric current to the coil 560 is substantially coincided with a tangential direction of a circle whose center is the swing support point 180 and which passes the long side part 560b. In other words, the directions of the electro-magnetic forces "F1" and "F2" generated in the coil 560 by supplying an electric current to the coil 560 are substantially coincided with directions which generate swing forces for swinging the photographing unit 1 with the swing support point 180 as a swing center. Therefore, a drive force of the shake correction drive mechanism 500 is enhanced by effectively utilizing the magnetic flux generated from the permanent magnet 520.

Further, in this embodiment, the center "CL3" of the coil part 23 is disposed at a remote position in the optical axis direction from the swing support point 180 with respect to the abutting face 527 of the permanent magnet 520. Therefore, in comparison with a case that the abutting face 527 of the permanent magnet 520 and the center "CL3" of the coil part 23 are disposed at an equivalent position in the optical axis direction to the swing support point 180, a torque for swinging the photographing unit 1 with the swing support point 180 as a swing center is large. Accordingly, a drive force of the shake correction drive mechanism 500 is enhanced.

In addition, in this embodiment, the long side part 560a of the coil part 560 is disposed in the first region 31 and the long side part 560b of the coil part 560 is disposed in the second region 32. Therefore, in comparison with a case that the short side parts are disposed in the first region 31 and the second region 32, the drive force of the shake correction drive mechanism 500 is further enhanced.

(Fixing Structure of Spring Member 600 to Movable Body 10)

Figure 12A:
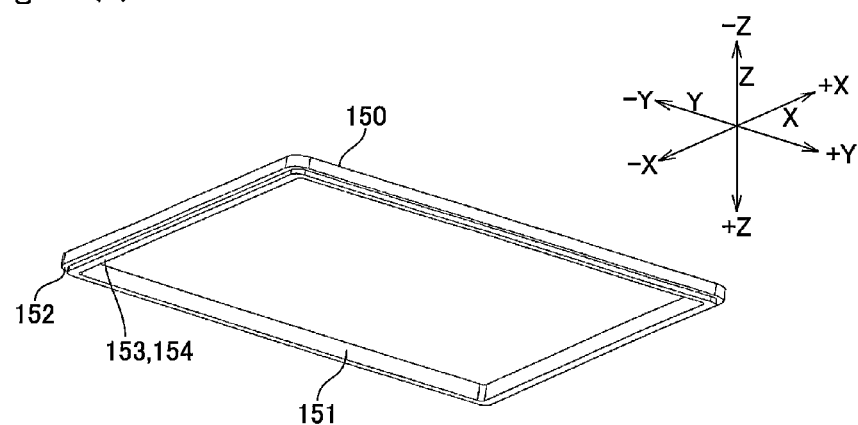
FIGS. 12(a) and 12(b) are explanatory views showing a connecting member which is used for fixing a spring member to a movable body in an optical unit with a shake correcting function to which at least an embodiment of the present invention is applied.
Figure 12B:
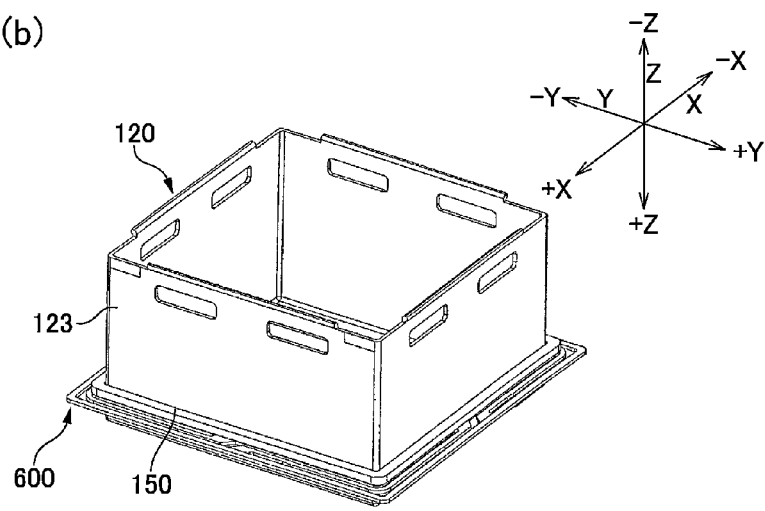
Figure 13:
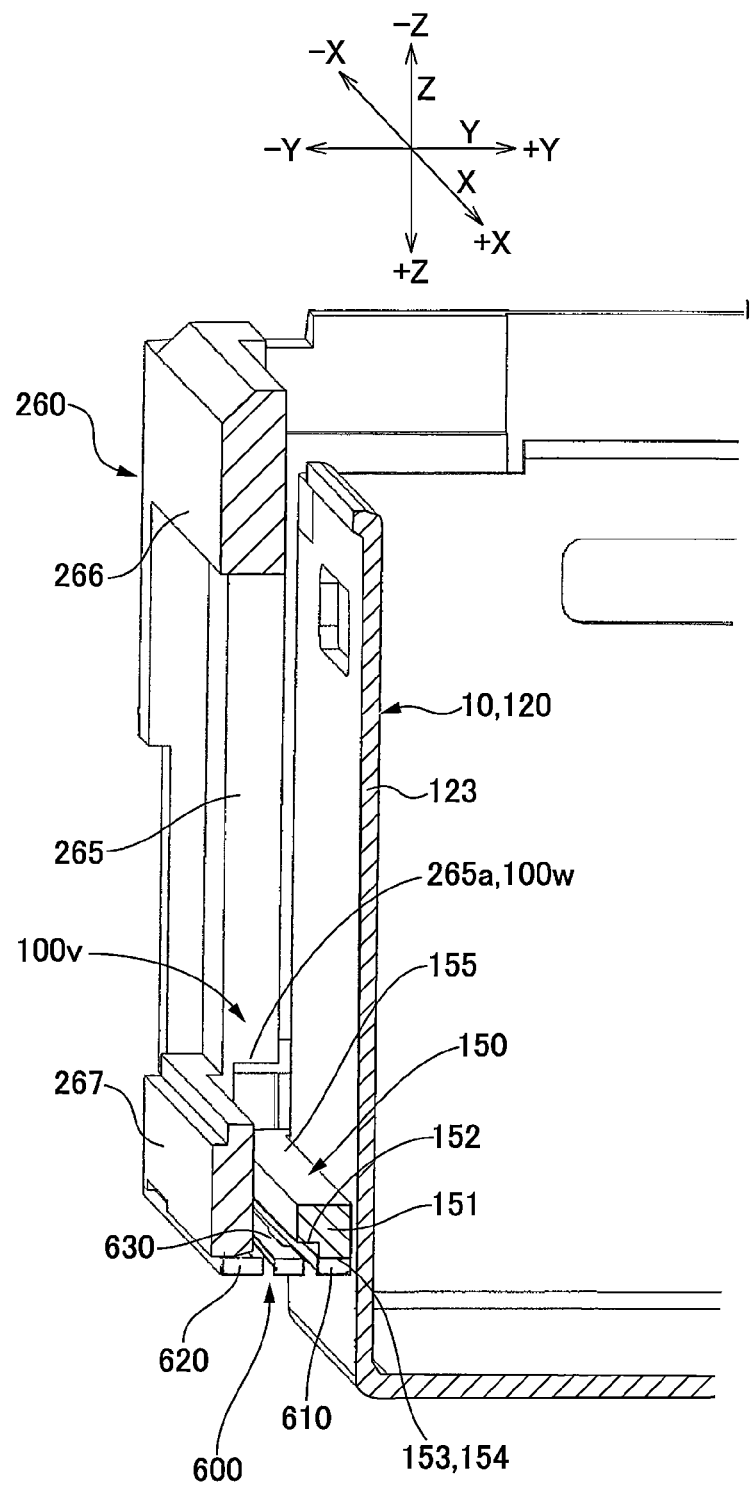
FIG. 13 is a cross-sectional view showing a positional relationship of a spring member, a connecting member, a tube-shaped cover and a coil holder in an optical unit with a shake correcting function to which at least an embodiment of the present invention is applied.
Figure 14:
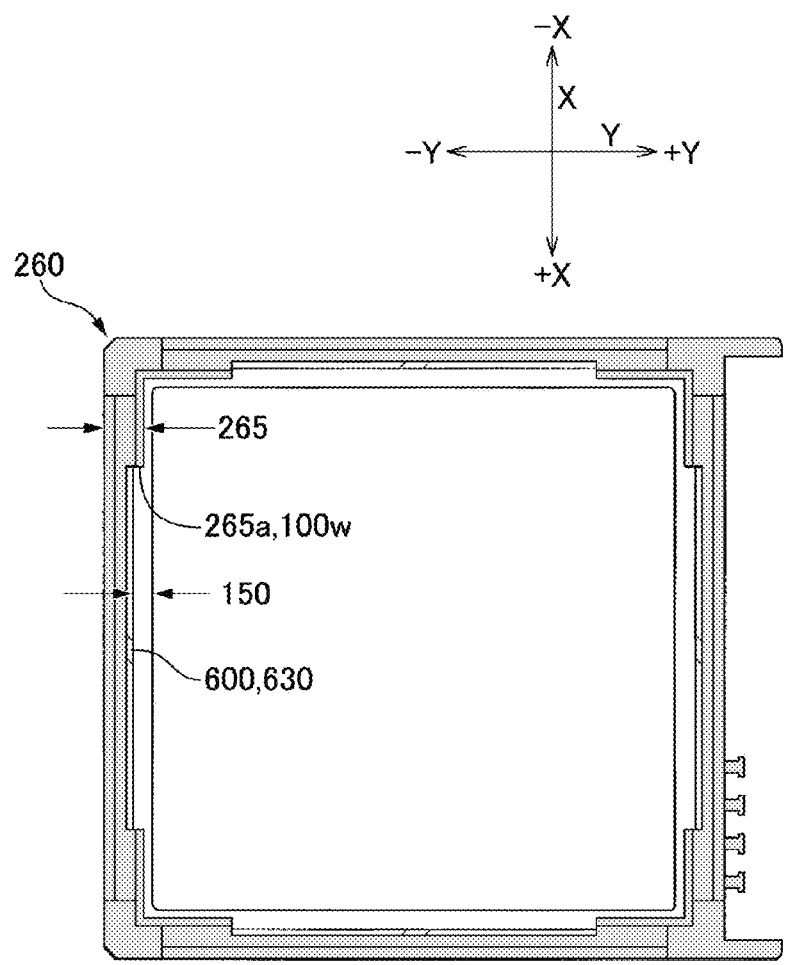
FIG. 14 is a plan view showing a positional relationship of a spring member, a connecting member, a tube-shaped cover and a coil holder, which is viewed from an object side in an optical axis direction, in an optical unit with a shake correcting function to which at least an embodiment of the present invention is applied.

FIGS. 12(a) and 12(b) are explanatory views showing a connecting member 150 which is used for fixing the spring member 600 to the movable body 10 in the optical unit 100 with a shake correcting function to which at least an embodiment of the present invention is applied. FIG. 12(a) is a perspective view showing a connecting member 150 which is viewed from a lower side (opposite side to an object side) and FIG. 12(b) is a perspective view showing a state that the spring member 600 is fixed to the movable body 10 by using the connecting member 150. FIG. 13 is a cross-sectional view showing a positional relationship of the spring member 600, the connecting member 150, the tube-shaped cover 120 and the coil holder 260 in the optical unit 100 with a shake correcting function to which at least an embodiment of the present invention is applied. FIG. 14 is a plan view showing a positional relationship of the spring member 600, the connecting member 150, the tube-shaped cover 120 and the coil holder 260, which are viewed from an object side in the optical axis direction, in the optical unit 100 with a shake correcting function to which at least an embodiment of the present invention is applied.

As shown in FIGS. 12(a) and 12(b), and FIG. 13, the movable body side connecting part 610 of the spring member 600 in the optical unit 100 with a shake correcting function is fixed to a substantially entire periphery of the tube-shaped cover 120 which structures a side face part of the movable body 10 and the fixed body side connecting part 620 of the spring member 600 is fixed to an under face of a lower frame portion 267 of the coil holder 260 of the fixed body 200 over its entire periphery.

In order to connect the spring member 600 to the movable body 10 and the fixed body 200, in this embodiment, the connecting member 150 in a rectangular frame shape is fixed to the rectangular tube part 123 of the tube-shaped cover 120 at a midway position in the optical axis direction and the movable body side connecting part 610 of the spring member 600 is fixed to the connecting member 150. In this embodiment, the connecting member 150 is fixed to the tube-shaped cover 120 over its entire periphery with an adhesive and the movable body side connecting part 610 of the spring member 600 is fixed to the connecting member 150 over its entire periphery with an adhesive.

A thickness dimension in the optical axis direction of the connecting member 150 is larger than that of the movable body side connecting part 610 and an inner face of the connecting member 150 is fixed to the tube-shaped cover 120. Further, the movable body side connecting part 610 is fixed to an end face 153 of the connecting member 150 on an opposite side ("+Z" side) to an object side in the optical axis direction and a width dimension of the end face 153 is larger than a thickness dimension of the movable body side connecting part 610. Therefore, an adhesive area between the connecting member 150 and the tube-shaped cover 120 and an adhesive area between the connecting member 150 and the movable body side connecting part 610 are larger than an adhesive area in a case that a side face of the movable body side connecting part 610 is directly fixed to the tube-shaped cover 120 with an adhesive.

In this embodiment, an outer side portion of the end face 153 of the connecting member 150 on an opposite side ("+Z" side) to an object side is formed in a recessed part 152 which is recessed toward an object side ("-Z" side) with respect to an inner side portion of the end face 153. The recessed part 152 is formed over the entire periphery of the connecting member 150. Although the arm parts 630 are extended from the movable body side connecting part 610 of the spring member 600, sufficient gap spaces are provided between the arm parts 630 and the connecting member 150 in the optical axis direction and a direction perpendicular to the optical axis.

Further, since the recessed part 152 is formed on an outer side portion of the end face 153 of the connecting member 150, only an inner side portion of the end face 153 of the connecting member 150 is utilized as a spring fixing face 154. However, a width dimension of the spring fixing face 154 is larger than a thickness dimension of the movable body side connecting part 610. Therefore, an adhesive area between the spring fixing face 154 of the connecting member 150 and the movable body side connecting part 610 is larger than an adhesive area in a case that a side face of the movable body side connecting part 610 is directly fixed to the tube-shaped cover 120 with an adhesive.

Further, in this embodiment, a stopper mechanism 100w which determines a movable range when the movable body 10 is displaced to an object side in the optical axis direction is structured by utilizing the connecting member 150. More specifically, as shown in FIG. 8(b) and FIGS. 13 and 14, an inner side portion of a vertical frame portion 265 of the coil holder 260 is protruded to an inner side, and the protruded portion 265a faces the connecting member 150 on an object side in the optical axis direction through a gap space as a stopper part. The protruded portion 265a structures the stopper mechanism 100w at each of corner portions of the movable body 10. Therefore, even when the movable body 10 is displaced toward an object side due to an impact from the outside or the like, the connecting member 150 abuts with the protruded portion 265a of the coil holder 260 and thus further movement of the movable body 10 is prevented.

As described above, in this embodiment, the connecting member 150 whose thickness dimension in the optical axis direction is larger than that of the movable body side connecting part 610 of the spring member 600 is fixed to the side face part of the movable body 10 and the movable body side connecting part 610 is fixed to one end face 153 in the optical axis direction of the connecting member 150. In other words, the end face 153 of the connecting member 150 and the movable body side connecting part 610 of the spring member 600 are fixed to each other so as to be superposed in the optical axis direction. In this embodiment, a thickness dimension of the connecting member 150 is larger than a thickness dimension of the movable body side connecting part 610. Therefore, a fixed area of the connecting member 150 to the side face part of the movable body 10 is large and thus the fixing strength is large. Further, an overlapped area of the end face 153 of the connecting member 150 with the movable body side connecting part 610 is large even when the thickness of the movable body side connecting part 610 is thin. Therefore, even in a case that the spring member 600 is fixed to a side face part of the movable body 10 in consideration of setting of a swingable angle of the movable body 10, layout around the spring member, and the like, a sufficient fixing strength is secured.

Further, the movable body side connecting part 610 is fixed to the end face 153 on an opposite side to an object side in the connecting member 150 (face on a side where the swing center of the movable body 10 is located) and thus the permanent magnet 520 can be provided on an object side with respect to the connecting member 150 without a problem.

Further, the connecting member 150 is provided on the end face 153 on which the movable body side connecting part 610 is superposed with the spring fixing face 154, which is fixed to the movable body side connecting part 610, and the recessed part 152 which is recessed on an outer side with respect to the spring fixing face 154. Therefore, even when the movable body 10 is swung to change its posture, the arm part 630 and the connecting member 150 are not interfered with each other. Accordingly, since a force applied to the movable body 10 from the spring member 600 is not varied, the movable body 10 can be swung appropriately.

Further, the coil holder 260 in the fixed body 200 is provided with the protruded part 265a facing the connecting member 150 on an object side in the optical axis direction through a gap space as a stopper part of the stopper mechanism 100w and thus a movable range to an object side of the movable body 10 is restricted by utilizing the connecting member 150.

(Stopper Mechanism in "X"-axis Direction and "Y"-axis Direction to Movable Body 10)

Figure 15A:
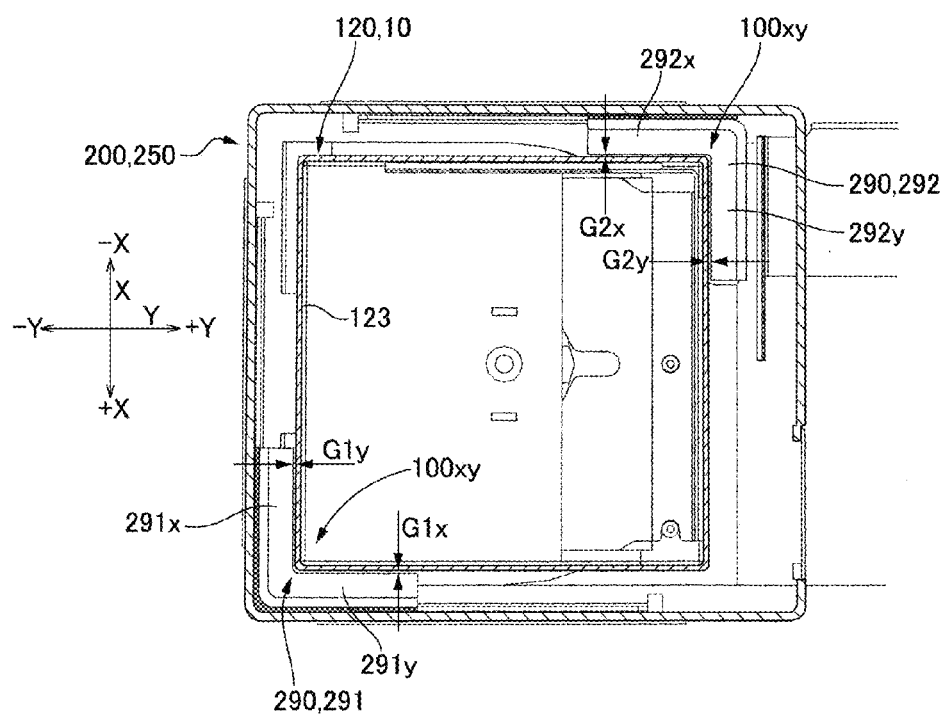
FIGS. 15(a) and 15(b) are explanatory views showing a stopper mechanism which determines a movable range in an "X"-axis direction and a "Y"-axis direction of a movable body in an optical unit with a shake correcting function to which at least an embodiment of the present invention is applied.
Figure 15B:
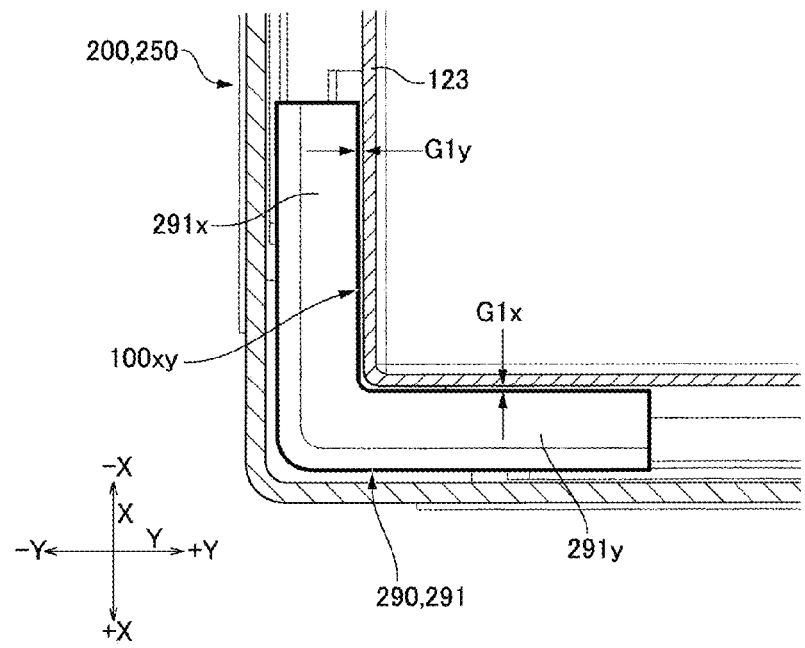

FIGS. 15(a) and 15(b) are explanatory views showing a stopper mechanism which determines a movable range in the "X"-axis direction and the "Y"-axis direction of the movable body 10 in the optical unit 100 with a shake correcting function to which at least an embodiment of the present invention is applied. FIG. 15(a) is an "XY" cross-sectional view showing the optical unit 100 with a shake correcting function and FIG. 15(b) is an enlarged explanatory view showing a corner portion where a stopper member is disposed.

As shown in FIGS. 4 and 5, FIG. 8(b), FIG. 10 and FIGS. 15(a) and 15(b), in this embodiment, a stopper member 290 (first stopper member 291 and second stopper member 292) is disposed at two diagonal corner portions for the movable body 10 and the fixed body 200. The stopper member 290 is fixed to an inner face of the rectangular tube-shaped body part 210 of the case 250 of the fixed body 200. Further, the stopper member 290 is disposed between the spring member 600 and the swing center of the movable body 10 through the swing support point 180 (contacted position of the protruded part 125 with the plate spring part 273 of the bottom plate 270/swing support point) in the optical axis direction. Therefore, the stopper member 290 protrudes toward the tube-shaped cover 120 of the movable body 10 from an inner face of the case 250 of the fixed body 200 between the spring member 600 and the swing center of the movable body 10 in the optical axis direction and the stopper member 290 structures a stopper mechanism 100xy which determines a movable range in the "X"-axis direction and the "Y"-axis direction of the movable body 10.

More specifically, two stopper members 290 are formed in an "L"-shape which is extended from diagonal positions in a quadrangular shape to both sides along the side parts of the quadrangle. Therefore, an inner side face of a portion 291x of the first stopper member 291 extending in the "X"-axis direction is oppositely disposed to a face located on the "−Y" side in the "Y"-axis direction of the rectangular tube part 123 of the tube-shaped cover 120 which structures an outer peripheral side face of the movable body 10 through a gap space "G1y" to determine a movable range to the "−Y" side of the movable body 10. Further, an inner side face of a portion 291y of the first stopper member 291 extending in the "Y"-axis direction is oppositely disposed to a face located on the "+X" side in the "X"-axis direction of the rectangular tube part 123 of the tube-shaped cover 120 through a gap space "G1x" to determine a movable range to the "+X" side of the movable body 10.

On the other hand, an inner side face of a portion 292x of the second stopper member 292 extending in the "X"-axis direction is oppositely disposed to a face located on the "+Y" side in the "Y"-axis direction of the rectangular tube part 123 of the tube-shaped cover 120 through a gap space "G2y" to determine a movable range to the "+Y" side of the movable body 10. Further, an inner side face of a portion 292y of the second stopper member 292 extending in the "Y"-axis direction is oppositely disposed to a face located on the "−X" side in the "X"-axis direction of the rectangular tube part 123 of the tube-shaped cover 120 through a gap space "G2x" to determine a movable range to the "−X" side of the movable body 10.

Therefore, even when the movable body 10 is displaced in the "X"-axis direction and the "Y"-axis direction due to an impact from the outside, a displacement amount of the movable body 10 is small. Accordingly, even when the spring member 600 is connected with the movable body 10 and the fixed body 200, the arm part 630 of the spring member 600 is not plastically deformed.

In this embodiment, both of the portion 291x extending in the "X"-axis direction and the portion 291y extending in the "Y"-axis direction of the first stopper member 291 are fixed to the inner face of the case 250. On the other hand, in the second stopper member 292, only the portion 292x extending in the "X"-axis direction is fixed to the inner face of the case 250 and the portion 292y extending in the "Y"-axis direction is separated from the case 250 and is not fixed to the case 250.

The stopper member 290 is formed in an "L"-shape in cross section and a dimension in the optical axis direction of a side of the stopper member 290 which is fixed to the case 250 is larger than a dimension in the optical axis direction of its portion facing the movable body 10. Therefore, a joined area of the stopper member 290 to the case 250 is wide.

Further, the stopper member 290 and the case 250 are made of metal such as SUS or aluminum and, in addition, the stopper member 290 and the case 250 are made of the same material. Therefore, when the stopper member 290 and the case 250 are fixed to each other by welding or the like in which a laser beam or the like is utilized, the stopper member 290 and the case 250 are joined to each other firmly.

Accordingly, even in a case that a joined area to the case 250 is relatively narrow like the second stopper member 292, the second stopper member 292 is fixed to the case 250 firmly. Therefore, according to the stopper mechanism 100xy, the second stopper member 292 is not deformed even when an impact is applied from the outside.

(Principal Effects in this Embodiment)

As described above, in the optical unit 100 (optical unit with a shake correcting function) in this embodiment, the movable body 10 is supported by the spring member 600 so as to be capable of swinging with respect to the fixed body 200 and thus, when the shake correction drive mechanism 500 is operated, the movable body 10 can be swung. Therefore, even when a shake is occurred in the optical unit 100 due to a shake in hand or the like, the shake can be corrected by swinging of the movable body 10.

Further, in the optical unit 100 in this embodiment, the stopper mechanism 100xy which determines a movable range of the movable body in a direction perpendicular to the optical axis direction is provided between the spring member 600 and the swing center of the movable body 10 in the optical axis direction. Therefore, even when the movable body 10 is displaced in a direction intersecting the optical axis due to an impact from the outside, the movable body 10 is not displaced largely. Accordingly, a problem is prevented in which the spring member 600 is plastically deformed to cause malfunction in succeeding operations. Further, the stopper mechanism 100xy is provided between the spring member 600 and the swing center of the movable body 10 in the optical axis direction and thus, when the movable body 10 is swung, the movable range is determined in a range where a displaced amount of the movable body 10 is small. Therefore, even when the movable range of the movable body 10 in a direction perpendicular to the optical axis direction is set narrow, the movable body 10 is swung properly. Accordingly, a gap space between the movable body 10 side and the fixed body 200 side in the stopper mechanism 100xy can be set narrow and thus the size of the optical unit 100 can be reduced suitably.

Further, the stopper mechanism 100xy is comprised of the stopper member 290 which is fixed so as to protrude from the fixed body 200 toward the movable body 10. Therefore, the movable range of the movable body 10 is appropriately set by adjusting a fixed position of the stopper member 290.

Further, in this embodiment, the stopper member 290 and the member (case 250) to which the stopper member 290 is fixed are structured of the same metal material and are fixed to each other by welding. Therefore, the stopper member 290 is surely fixed to the fixed body 200.

Further, in this embodiment, an outer peripheral face of the movable body 10 and an inner peripheral face of the fixed body 200 are provided with a quadrangular shape when viewed in the optical axis direction and the stopper member 290 is provided at two diagonal positions of a quadrangular shape. According to this structure, the stopper member 290 is provided by utilizing a vacant area of the corner portion. Further, when the stopper member 290 is provided at two diagonal positions of a quadrangular shape, a movable range in all directions of the movable body 10 is determined by the stopper mechanism 100xy at minimum positions. In addition, the stopper member 290 is formed in an "L"-shape which is extended from two diagonal positions of a quadrangle to both sides along the side parts of the quadrangle and thus a movable range in all directions of the movable body 10 is determined by two stopper members 290.

The stopper member 290 may be provided on either side of the movable body 10 and the fixed body 200 when the stopper member 290 is protruded from one of the movable body 10 and the fixed body 200 toward the other side. In this embodiment, the stopper member 290 is fixed to the fixed body 200. Therefore, in comparison with a case that the stopper member 290 is fixed to the movable body 10, the weight of the movable body 10 is reduced. Accordingly, a large torque is not required for swinging the movable body 10 and thus the size of the shake correction drive mechanism 500 can be reduced and, even when the size of the shake correction drive mechanism 500 is relatively small, the swing of the movable body 10 to a shake of the optical unit 100 is performed with high responsiveness.

[Another Structural Embodiment of Optical Unit for Photographing]

(Entire Structure)

Figure 16A:
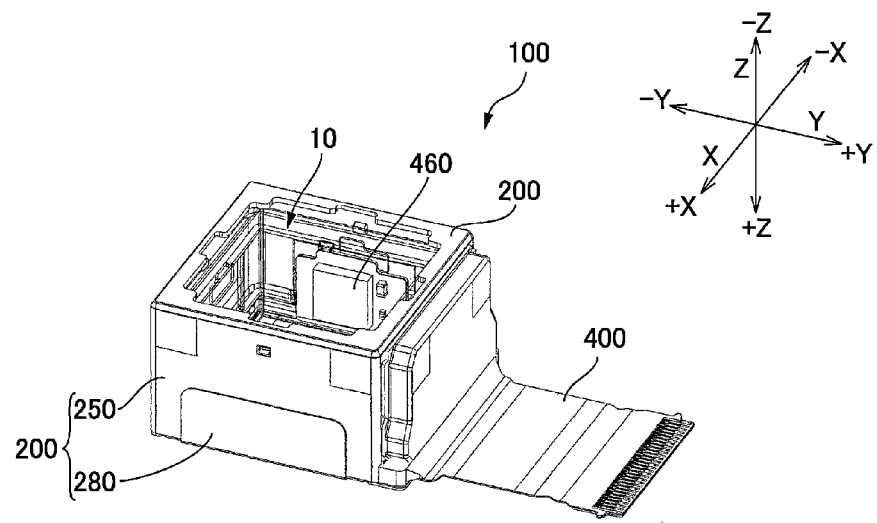
FIGS. 16(a) and 16(b) are perspective views showing an outward appearance and the like of another optical unit with a shake correcting function to which at least an embodiment of the present invention is applied.
Figure 16B:
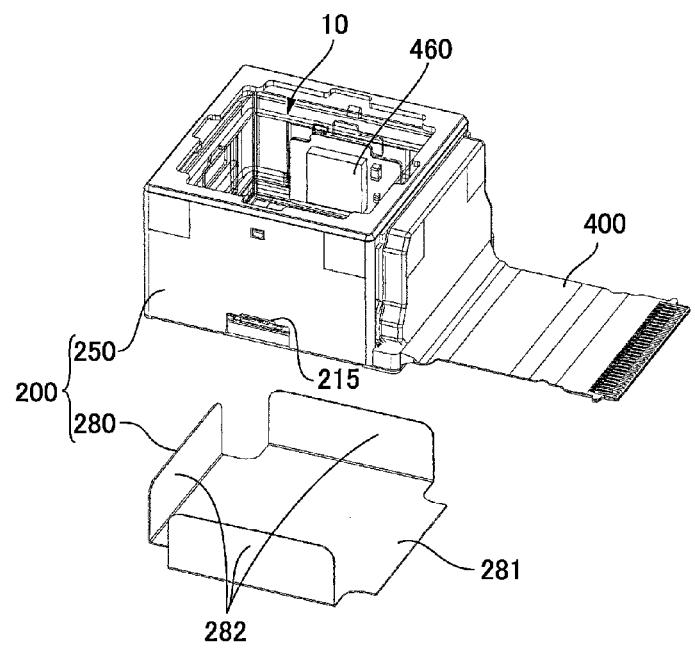
Figure 17:
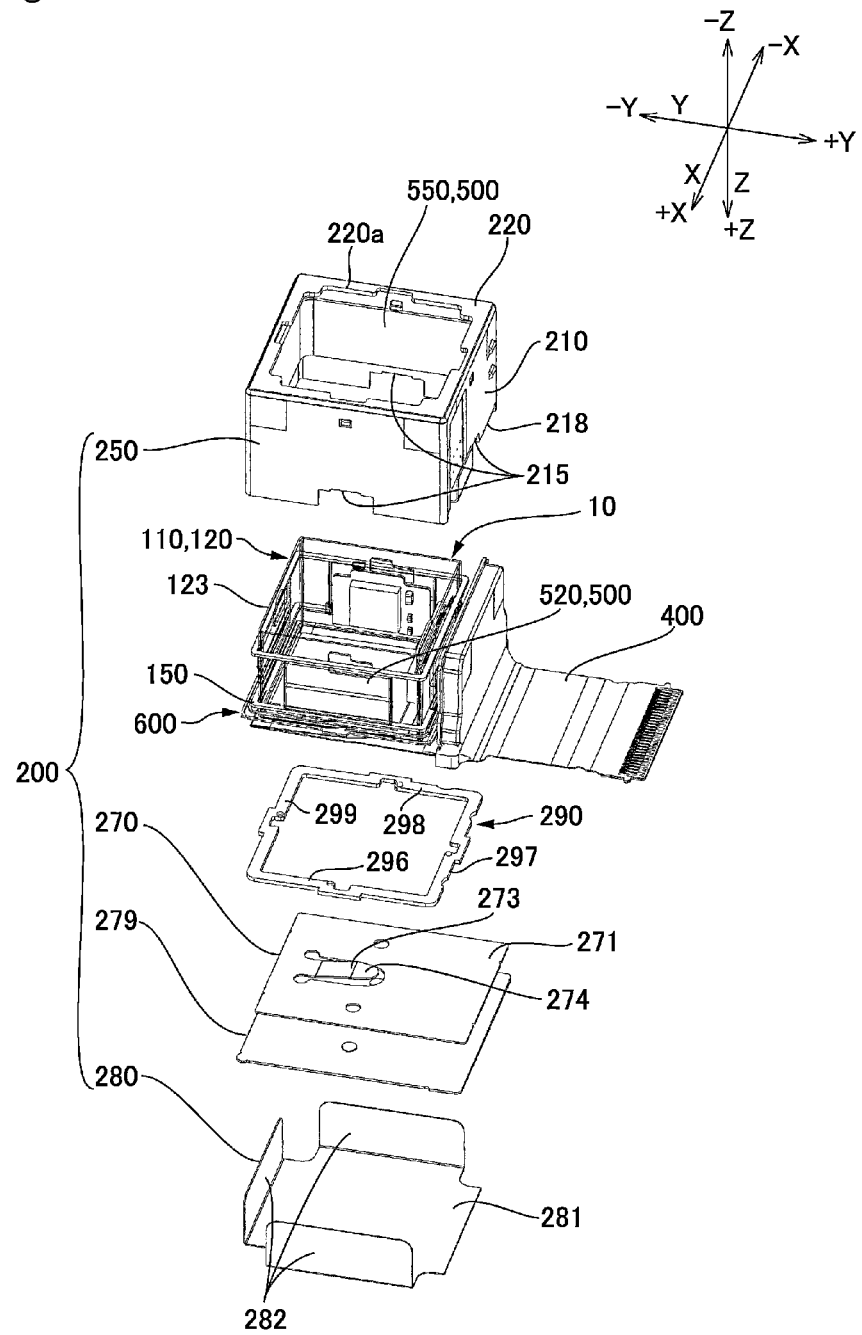
FIG. 17 is an exploded perspective view showing another optical unit with a shake correcting function to which at least an embodiment of the present invention is applied.

FIGS. 16(a) and 16(b) are perspective views showing an outward appearance and the like of another optical unit 100 with a shake correcting function to which at least an embodiment of the present invention is applied. FIG. 16(a) is a perspective view showing an optical unit 100 which is viewed from an object side and FIG. 16(b) is a perspective view showing the optical unit 100 from which a seal cover 280 is detached. FIG. 17 is an exploded perspective view showing another optical unit 100 with a shake correcting function to which at least an embodiment of the present invention is applied. The basic structure in this embodiment is similar to the optical unit 100 which is described with reference to FIGS. 1 through 15(b) and thus the same reference signs are used in common portions and their detailed description is omitted.

Similarly to the above-mentioned embodiment, an optical unit 100 (optical unit with a shake correcting function) shown in FIGS. 16(a) and 16(b) is also a thin camera which is used in an optical device 1000 such as a cell phone with a camera shown in FIG. 1. Also in the optical unit 100, similarly to the above-mentioned embodiment, the movable body 10 which holds the photographing unit 1 is supported in an inside of the fixed body 200 so as to be capable of swinging and the movable body 10 is swung on the basis of a detected result of a shake in hand by a shake detection sensor such as a gyroscope 460 mounted on the optical unit 100 or a gyroscope mounted on a main body side of the optical device 1000. A flexible circuit board 400 is extended out from the optical unit 100 for supplying power to the photographing unit 1 and the shake correction drive mechanism 500. The flexible circuit board 400 is electrically connected with a host control section or the like which is provided in a main body of the optical device 1000. Further, the flexible circuit board 400 is also provided with a function for outputting a signal from the photographing unit 1.

As shown in FIG. 17, the optical unit 100 includes a fixed body 200, a movable body 10, a spring member 600 which supports the movable body 10 so as to be displaced with respect to the fixed body 200, and a shake correction drive mechanism 500 which is structured to generate a magnetic drive force for relatively displacing the movable body 10 with respect to the fixed body 200 between the movable body 10 and the fixed body 200.

The fixed body 200 includes a case 250, a bottom plate 270, a support plate 279 and a seal cover 280. The case 250 includes a rectangular tube-shaped body part 210 surrounding the movable body 10, and an end plate part 220 which closes an opening part on an object side of the rectangular tube-shaped body part 210. A window 220a through which light from an object to be photographed is incident is formed in the end plate part 220. The rectangular tube-shaped body part 210 of the case 250 is formed with a rectangular cut-out portion 215 in addition to a cut-out portion 218 for extending out the flexible circuit board 400. The cut-out portion 215 is utilized to fix a stopper member 290 described below. A sheet 550 in a belt shape is held on an inner face of the case 250 and the sheet 550 structures a sheet-shaped coil body which is provided with coils of the shake correction drive mechanism 500. The bottom plate 270 is a press-worked product of a metal plate and a plate spring part 273 which is obliquely cut and bent is formed at a substantially center portion of the bottom plate part 271 formed in a substantially rectangular shape. The seal cover 280 is provided with a bottom plate part 281 which is superposed on the bottom plate part 271 of the bottom plate 270 on an opposite side to an object side, and three side plate parts 282 which are stood up toward an object side from two sides facing each other in the "X"-axis direction and a side located on the "–Y" side in the "Y"-axis direction of outer circumferential edges of the bottom plate part 281. The side plate parts 282 are fixed to an outer face of the rectangular tube-shaped body part 210 of the case 250. As a result, three of four cut-out portions 215 formed in the rectangular tube-shaped body part 210 are covered by the side plate parts 282.

Figure 19A:
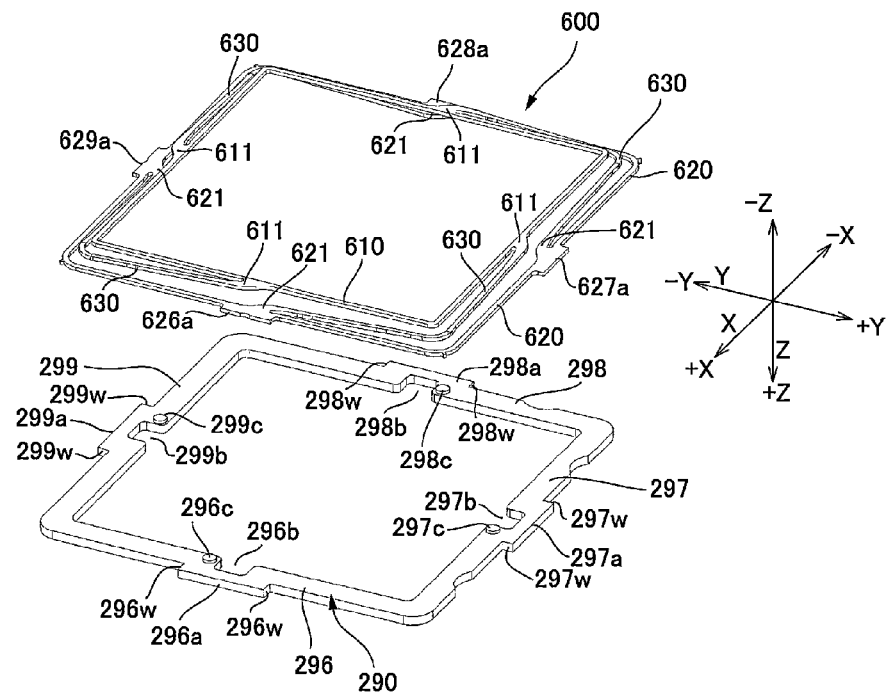
FIGS. 19(a) and 19(b) are explanatory views showing a stopper member and the like which are used in another optical unit with a shake correcting function to which at least an embodiment of the present invention is applied.
Figure 19B:
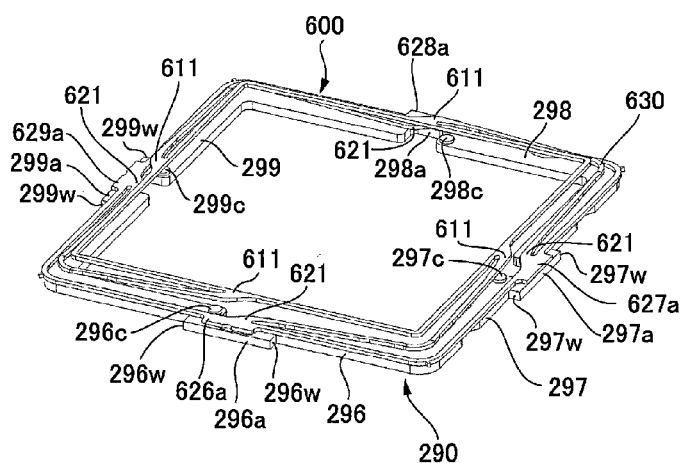

The movable body 10 is formed in a rectangular parallelepiped shape and is provided with a cover 110 described with reference to FIG. 3 which holds the photographing unit 1 on its inner side. The cover 110 is provided with a bottomed tube-shaped cover 120 which covers the photographing unit 1. The tube-shaped cover 120 is a press-worked product made of a metal plate and an end part on an opposite side to an object side of the rectangular tube part 123 structures a swing support point 180 described with reference to FIG. 7 together with the tip end part 274 of the plate spring part 273. A connecting member 150 in a rectangular frame shape is fixed to an outer peripheral face of the tube-shaped cover 120 and the spring member 600 described with reference to FIGS. 19(a) and 19(b) is connected to the movable body 10 by utilizing the connecting member 150. Further, a permanent magnet 520 structuring the shake correction drive mechanism 500 together with the coil 560 is fixed to each of four outer peripheral faces of the tube-shaped cover 120.

(Stopper Mechanism in "X"-Axis Direction and "Y"-Axis Direction to Movable Body 10)

Figure 18A:
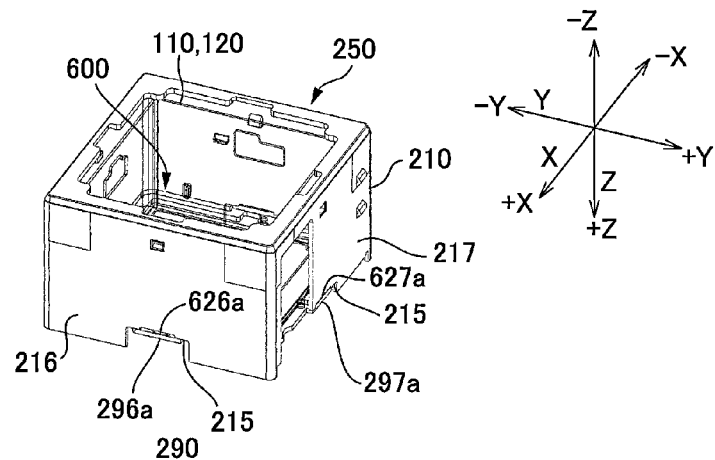
FIGS. 18(a) and 18(b) are explanatory views showing a stopper mechanism which determines a movable range in an "X"-axis direction and a "Y"-axis direction of a movable body in another optical unit with a shake correcting function to which at least an embodiment of the present invention is applied.
Figure 18B:
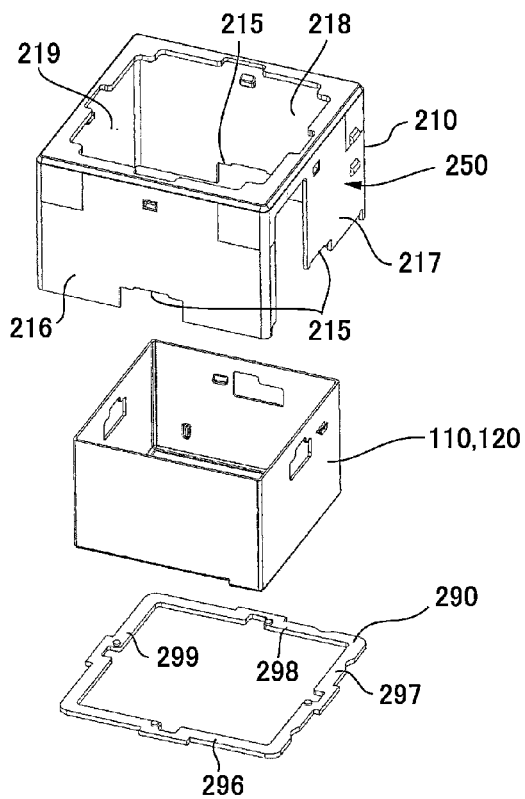
Figure 20:
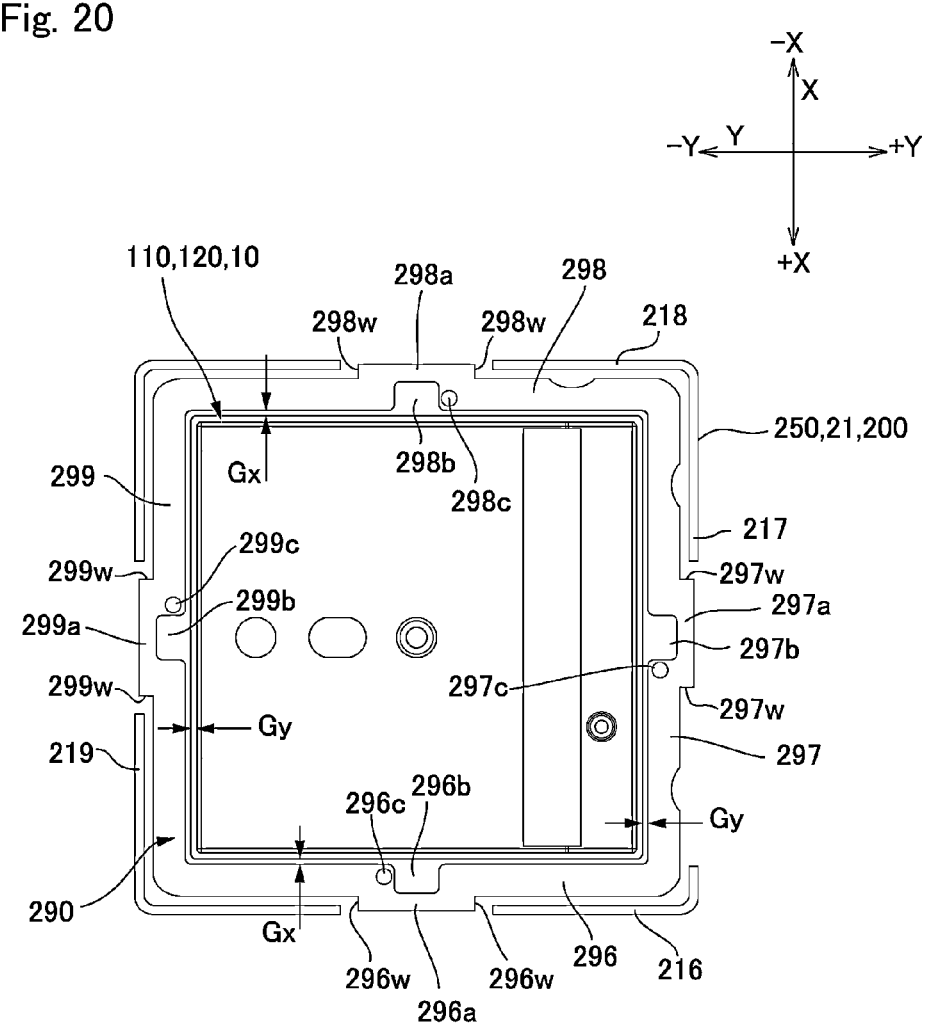
FIG. 20 is an explanatory view showing a planar structure of a stopper mechanism which is used in another optical unit with a shake correcting function to which at least an embodiment of the present invention is applied.

FIGS. 18(a) and 18(b) are explanatory views showing a stopper mechanism 100xy which determines a movable range in the "X"-axis direction and the "Y"-axis direction of the movable body 10 in another optical unit 100 with a shake correcting function to which at least an embodiment of the present invention is applied. FIG. 18(a) is an explanatory view showing a positional relationship and the like of a case 250, a cover 110 (movable body 10) and a stopper member 290 which structure a stopper mechanism, and FIG. 18(b) is an explanatory view showing these members which are disassembled. FIGS. 19(a) and 19(b) are explanatory views showing a stopper member 290 and the like which are used in another optical unit 100 with a shake correcting function to which at least an embodiment of the present invention is applied. FIG. 19(a) is an explanatory view showing the stopper member 290 and the spring member 600 which are disassembled and FIG. 19(b) is an explanatory view showing a state that the stopper member 290 and the spring member 600 are overlapped with each other. FIG. 20 is an explanatory view showing a planar structure of the stopper mechanism 100xy which is used in another optical unit 100 with a shake correcting function to which at least an embodiment of the present invention is applied. FIG. 18(a) shows a state that the spring member 600 is attached to the cover 110 (movable body 10). Further, FIGS. 19(a) and 19(b) show a state that the movable body side connecting part 610 of the spring member 600 is pushed up to an object side with respect to the fixed body side connecting part 620.

In this embodiment, the stopper mechanism 100xy which determines a movable range in the "X"-axis direction and the "Y"-axis direction of the movable body 10 is structured of a case 250, a tube-shaped cover 120 and a stopper member 290 shown in FIG. 17 and FIGS. 18(a) and 18(b). Also in this embodiment, similarly to the above-mentioned embodiment, the stopper member 290 is disposed between the spring member 600 and the swing center (swing support point 180) of the movable body 10 in the optical axis direction.

As shown in FIGS. 19(a) and 19(b) and FIG. 20, in this embodiment, the stopper member 290 is structured of a rectangular frame shaped product provided with four sides 296 through 299 which are extended along an outer peripheral face of the movable body 10 (outer peripheral face of the tube-shaped cover 120) and along an inner peripheral face of the fixed body 200. The stopper member 290 is fixed to an inner peripheral face of the case 250. In this state, two sides 297 and 299 extending in the "X"-axis direction of the stopper member 290 face the tube-shaped cover 120 through a gap space "Gy" in the "Y"-axis direction to determine the movable range in the "Y"-axis direction of the movable body 10. Further, inner side faces of portions 296 and 298 extending in the "Y"-axis direction of the stopper member 290 face the tube-shaped cover 120 through a gap space "Gx" in the "X"-axis direction to determine the movable range in the "X"-axis direction of the movable body 10. Therefore, even when the movable body 10 is displaced in the "X"-axis direction and the "Y"-axis direction due to an impact applied from the outside, a displacement amount of the movable body 10 is small. Accordingly, even in a case that the spring member 600 is connected with the movable body 10 and the fixed body 200, the arm part 630 of the spring member 600 is not plastically deformed. Further, the stopper mechanism 100xy is provided between the spring member 600 and the swing center of the movable body 10 in the optical axis direction and thus, when the movable body 10 is swung, the movable range can be determined in a range where a displaced amount of the movable body 10 is small. Therefore, even when the movable range of the movable body 10 is set narrow in a direction perpendicular to the optical axis direction, the movable body 10 is swung appropriately. Accordingly, a gap space between the movable body 10 side and the fixed body 200 side in the stopper mechanism 100xy can be set narrow and thus the size of the optical unit 100 is suitably reduced.

(Fixing Structure of Stopper Member 290 to Case 250)

In the optical unit 100 in this embodiment, the rectangular tube-shaped body part 210 of the case 250 is formed with a cut-out portion 215 facing an outer peripheral face of a side of the stopper member 290 in a side plate part facing at least two of four sides 296 through 299 of the stopper member 290. In this embodiment, the cut-out portion 215 is formed at positions facing the outer peripheral faces of the sides 296 through 299 of the stopper member 290 in four respective side plate parts 216 through 219 of the rectangular tube-shaped body part 210.

Further, the four sides 296 through 299 of the stopper member 290 are formed with fixing protruded parts 296a through 299a which are protruded from the outer peripheral face and are fitted to the cut-out portion 215. Therefore, in this embodiment, the case 250 and the fixing protruded parts 296a through 299a of the stopper member 290 are welded to each other in the cut-out portion 215 of the case 250 and thereby the stopper member 290 is fixed to the case 250. Therefore, in this embodiment, both of the case 250 and the stopper member 290 are formed of the same metal material, for example, SUS 304 to enhance weldability. In this embodiment, in order to weld the case 250 to the fixing protruded parts 296a through 299a of the stopper member 290, edges 296w through 299w of the fixing protruded parts 296a through 299a are welded to the case 250.

In this embodiment, when the case 250 and the stopper member 290 are to be fixed to each other by welding, a part of the fixed body side connecting part 620 of the spring member 600 shown in FIGS. 19(a) and 19(b) is sandwiched between the case 250 and the stopper member 290 and the fixed body side connecting part 620 of the spring member 600 is fixed to the fixed body 200.

More specifically, the spring member 600 is a plate-shaped spring member provided with a fixed body side connecting part 620 in a rectangular frame shape which is fixed to the fixed body 200, a movable body side connecting part 610 in a rectangular frame shape which is connected with the movable body 10, and a plurality of arm parts 630 which are extended between the movable body side connecting part 610 and the fixed body side connecting part 620. Both ends of the arm part 630 are respectively connected with the movable body side connecting part 610 and the fixed body side connecting part 620. In this embodiment, the arm part 630 is extended in an "L"-shape along two of four sides 296 through 299 of the stopper member 290. Therefore, a connected portion 611 of one arm part 630 with the movable body side connecting part 610 and a connected portion 621 of the one arm part 630 with the fixed body side connecting part 620 are located at two sides adjacent to each other of four sides 296 through 299 of the stopper member 290. In this embodiment, both of the connected portion 611 of the arm part 630 with the movable body side connecting part 610 and the connected portion 621 of the arm part 630 with the fixed body side connecting part 620 are located at a center in a longitudinal direction of the four sides 296 through 299 of the stopper member 290.

The spring member 600 is provided with fixing protruded parts 626a through 629a protruding toward outer sides at centers of the side parts of the fixed body side connecting part 620. The fixing protruded parts 626a through 629a are formed at positions superposing the fixing protruded parts 296a through 299a of the stopper member 290 and the fixing protruded parts 626a through 629a are also respectively fitted to the inside of the cut-out portion 215. In this embodiment, the tip ends of the fixing protruded parts 626a through 629a and the tip ends of the fixing protruded parts 296a through 299a are superposed on each other but a dimension in the side direction of the fixing protruded parts 626a through 629a is smaller than a dimension in the side direction of the fixing protruded parts 296a through 299a. Therefore, an upper edge of the cut-out portion 215 (edge on an object side) is structured of a two-stage edge part comprised of short edge parts to which the sides of the fixing protruded parts 626a through 629a are fitted and long edge parts to which the sides of the fixing protruded parts 296a through 299a are fitted. Therefore, first, the fixing protruded parts 626a through 629a are fitted to the short edge parts of the cut-out portions 215 and are welded in the thickness direction. Next, when the fixing protruded parts 296a through 299a are fitted to the inner sides of the long edge parts of the cut-out portions 215, the fixing protruded parts 626a through 629a are sandwiched between the upper edges of the cut-out portions 215 (edges on an object side) and the fixing protruded parts 296a through 299a. In this state, both ends in the side direction of the fixing protruded parts 296a through 299a are projected from both ends of the fixing protruded parts 626a through 629a. Therefore, in this embodiment, the edges 296w through 299w of the fixing protruded parts 296a through 299a which are projected from the fixing protruded parts 626a through 629a are welded to the inner edges of the cut-out portions 215 in the thickness direction. As a result, the stopper member 29 is fixed to the case 250 and the fixed body side connecting part 620 of the spring member 600 is also fixed to the case 250. In this case, the welding is performed on the upper edge of the cut-out portion 215 by utilizing the thickness of the side plate parts 216 through 219 and is not projected to an outer side.

(Relationship between Stopper Member 290 and Spring Member 600)

Figure 21A:
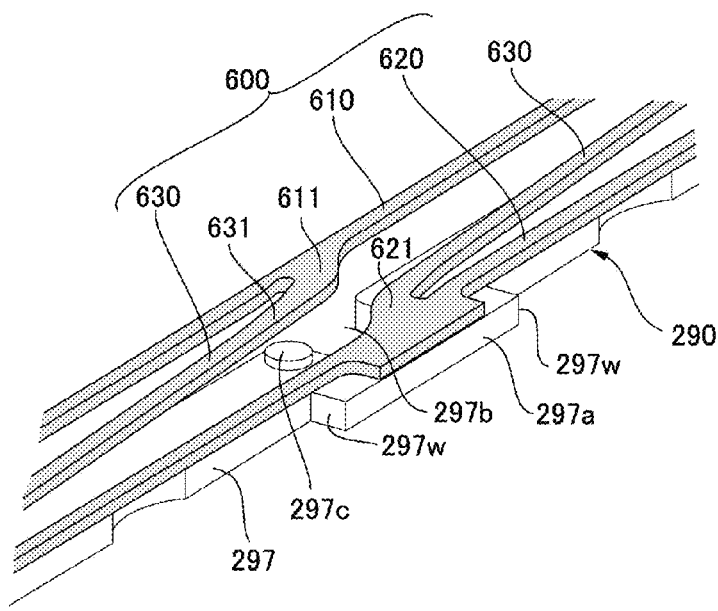
FIGS. 21(a) and 21(b) are explanatory enlarged views showing an overlapped portion of a stopper member with a spring member in another optical unit with a shake correcting function to which at least an embodiment of the present invention is applied.
Figure 21B:
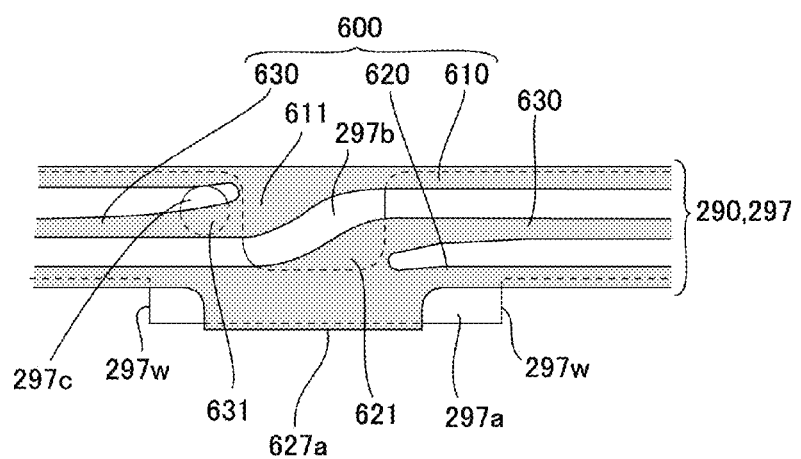

FIGS. 21(a) and 21(b) are explanatory enlarged views showing an overlapped portion of the stopper member 290 with the spring member 600 in another optical unit 100 with a shake correcting function to which at least an embodiment of the present invention is applied. FIG. 21(a) is a perspective view showing the overlapped portion and FIG. 21(b) is a plan view showing the overlapped portion. In FIGS. 21(a) and 21(b), an enlarged overlapped portion of the side 297 of the stopper member 290 with the spring member 600 is shown.

As shown in FIGS. 19(a) and 19(b) and FIG. 20, in the optical unit 100 in this embodiment, the stopper member 290 and the spring member 600 are disposed so as to superpose on each other in the optical axis direction. In this embodiment, when the movable body 10 is incorporated into an inside of the fixed body 200, the movable body 10 is pushed up by the swing support point 180 to an object side and thus the movable body side connecting part 610 of the spring member 600 is set in a state that the movable body side connecting part 610 is pushed up to an object side with respect to the fixed body side connecting part 620. Therefore, the movable body side connecting part 610 of the spring member 600 does not contact with the stopper member 290.

However, even in this state, the connected portion 621 of the arm part 630 with the fixed body side connecting part 620 of the spring member 600 is not pushed up to an object side. Therefore, in this embodiment, penetration parts 296b through 299b are formed on inner peripheral sides of the center parts of four sides 296 through 299 of the stopper member 290. The penetration parts 296b through 299b are overlapped with the connected portion 621 of the arm part 630 with the fixed body side connecting part 620 in the optical axis direction. Therefore, the arm part 630 and the stopper member 290 can be prevented from interfering with each other and thus the spring constant of the spring member 600 can be prevented from varying. In this embodiment, the penetration parts 296b through 299b are formed in the stopper member 290. However, a recessed part may be formed in the stopper member 290 instead of forming the penetration parts 296b through 299b in order to prevent interference with the connected portion 621 of the arm part 630 with the fixed body side connecting part 620.

Further, in this embodiment, the movable body side connecting part 610 of the spring member 600 is in a pushed-up state to an object side with respect to the fixed body side connecting part 620 and, in this state, the spring member 600 urges the movable body 10 toward an opposite side to an object side. However, when the movable body side connecting part 610 is moved to an opposite side to an object side with respect to the fixed body side connecting part 620, it may be happened that the spring member 600 urges the movable body 10 toward an object side and the movable body 10 is not supported by the swing support point 180.

In order to prevent the problem, projections 296c through 299c protruded toward an object side are formed on the stopper member 290 at a position overlapped with a portion 631 adjacent to the connected portion 611 of the arm part 630 with the movable body side connecting part 610 of the arm part 630. Therefore, the movable body side connecting part 610 is not moved to an opposite side to an object side with respect to the fixed body side connecting part 620. In this embodiment, the projections 296c through 299c are separated in the optical axis direction from the portion 631 adjacent to the connected portion 611 of the arm part 630 with the movable body side connecting part 610. Therefore, even when the projections 296c through 299c are formed, the spring constant does not vary.

In this embodiment, the projections 296c through 299c are a projected portion which is formed by pressing a face of the stopper member 290 from an opposite side to an object side. Therefore, the face of the stopper member 290 on an opposite side to an object side is formed with a recessed part at superposed positions on the projections 296c through 299c. Therefore, the projections 296c through 299c formed on the face on an object side of the stopper member 290 and the recessed parts formed on the face on an opposite side to an object side can be utilized as a mark for distinguishing the face on an object side of the stopper member 290 from its face on an opposite side to an object side. Accordingly, the stopper member 290 is prevented from being mounted in a state that its front and back sides are reversed and thus, when the dimensional accuracies are different from each other in the front and back sides of the stopper member 290, the optical unit 100 is manufactured appropriately.

Other Embodiments

In the embodiment described above, the stopper member 290 may be provided on the movable body 10 when the stopper member 290 protrudes from one of the movable body 10 and the fixed body 200 to the other side.

[Another Structural Embodiments of Optical Unit 100]

In the embodiment described above, the present invention is, as an example, applied to the optical unit 100 which is used in a cell phone with a camera. However, at least an embodiment of the present invention may be applied to the optical unit 100 which is used in a thin type digital camera or the like. Further, in the embodiment described above, the lens drive mechanism 5 which magnetically drives the movable body 3 including the photographing unit 1 having the lens 1a and the imaging element 1b in the optical axis direction is supported on the support body 2. However, at least an embodiment of the present invention may be applied to a fixed focus type optical unit in which the lens drive mechanism 5 is not mounted on the photographing unit 1.

In addition, other than a cell phone, a digital camera and the like, the optical unit 100 with a shake correcting function to which at least an embodiment of the present invention is applied may be fixed in an apparatus such as a refrigerator in which vibration is occurred in a certain interval and mounted so as to be capable of being remote controlled. According to the apparatus, a service can be provided in which information in the inside of the refrigerator is obtained at a visit place, for example, at the time of shopping. In this service, the camera system is provided with an attitude stabilizing device and thus a stable image can be transmitted even when vibration may occur in the refrigerator. Further, this device may be fixed to a device such as a bag, a satchel or a cap of a child and a student which is carried at a time of commuting or attending school. In this case, states of surroundings are photographed at a constant interval and, when the image is transmitted to a predetermined server, the parent or the like watches the image at a remote place to secure security of the child. In this application, without conscious of a camera, a clear image is photographed even when vibration occurs at the time of moving. Further, when a GPS is mounted in addition to a camera module, the position of a target person can be obtained simultaneously and thus, when an accident occurs, its position and situation can be confirmed immediately. In addition, when the optical unit 100 with a shake correcting function to which at least an embodiment of the present invention is applied is mounted at a position which is capable of photographing toward a front side in a car, it can be used as a drive recorder. Further, it may be structured that the optical unit 100 with a shake correcting function to which at least an embodiment of the present invention is applied is mounted at a position which is capable of photographing toward a front side in a car and a front side image is photographed automatically at a constant interval, which is automatically transmitted to a predetermined server. Further, when this image is distributed while interlocking with traffic jam information in the VICS (Vehicle Information and Communication System) of a car navigation system, the situation of a traffic jam can be provided further in detail. According to this service, similarly to a drive recorder mounted on a car, the situation when an accident has occurred can be recorded by a third person of passer-by without intention to utilize an inspection of the situation. Further, a clear image can be acquired without affected by vibration of a car. In a case of the application, when a power supply is turned on, a command signal is outputted to the control section and the shake control is started on the basis of the command signal.

Further, the optical unit 100 with a shake correcting function to which at least an embodiment of the present invention is applied may be applied to shake correction of an optical device from which a light beam is emitted such as a laser beam pointer, a portable or on-vehicle projection display device and direct viewing type display device. Further, in an observation system with a high magnification such as an astronomical telescope system or a binocular system, the optical unit 100 may be used to observe without using an auxiliary locking device such as three-legged supports. In addition, when the present invention is applied to a rifle or a turret of a tank, its attitude can be stabilized against vibration at the time of trigger and thus hitting accuracy can be enhanced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with a shake correcting function comprising:
 a movable body configured to hold an optical element;
 a fixed body which covers at least a side face part of the movable body;
 a spring member which is connected with the movable body and the fixed body;
 a shake correction drive mechanism configured to generate a drive force for swinging the movable body with respect to the fixed body; and
 a stopper mechanism which is provided between the spring member and a swing center of the movable body in an optical axis direction, and configured to determine a movable range of the movable body in a direction perpendicular to the optical axis direction;
 wherein the stopper mechanism is comprised of a stopper member which is fixed to one of the fixed body and the movable body so as to protrude toward the other side;
 wherein the stopper member is formed in a rectangular frame shape provided with four sides which are extended along an outer peripheral face of the movable body and an inner peripheral face of the fixed body;
 the fixed body comprises a cover which is provided with a rectangular tube-shaped body part surrounding the movable body;
 the movable body comprises a tube-shaped cover having a rectangular tube shape which structures a side face part of the movable body;
 side plate parts of the rectangular tube-shaped body part of the cover structuring the fixed body facing at least two of the four sides are formed with a cut-out portion at a position facing an outer peripheral face of the side of the stopper member,
 the stopper member is provided with a fixing protruded part which is protruded from the side and is fitted to the cut-out portion, and
 the stopper member is fixed to the fixed body by welding the fixing protruded part with an inner edge of the cut-out portion.

2. The optical unit with a shake correcting function according to claim 1,
 wherein a swing support point which structures the swing center of the movable body is provided between a rear side end part in the optical axis direction of the movable body and a bottom plate portion of the fixed body which faces the rear side end part of the movable body on a rear side in the optical axis direction.

3. The optical unit with a shake correcting function according to claim 1, wherein the stopper member and a member to which the stopper member is fixed are made of the same metal material and are fixed to each other by welding.

4. The optical unit with a shake correcting function according to claim 3, wherein
 an outer peripheral face of the movable body and an inner peripheral face of the fixed body are formed in a quadrangular shape when viewed in the optical axis direction, and
 the stopper member is provided at least at two diagonal positions of the quadrangular shape.

5. The optical unit with a shake correcting function according to claim 4, wherein the stopper member is formed in an "L"-shape which is extended from diagonal positions of a quadrangular shape to both sides along side parts of the quadrangular shape.

6. The optical unit with a shake correcting function according to claim 5, wherein
 the fixed body comprises a cover which is provided with a rectangular tube-shaped body part surrounding the movable body,
 the movable body comprises a tube-shaped cover having a rectangular tube shape which structures a side face part of the movable body,
 the stopper member formed in the "L"-shape is fixed to an inner face of the rectangular tube-shaped body part of the cover, and
 a dimension in the optical axis direction of the stopper member which is fixed to the rectangular tube-shaped body part is larger than a dimension in the optical axis direction of a portion of the stopper member facing the tube-shaped cover of the movable body.

7. The optical unit with a shake correcting function according to claim 6, wherein a swing support point which structures the swing center of the movable body is provided between a rear side end part in the optical axis direction of the movable body and a bottom plate portion of the fixed body which faces the rear side end part of the movable body on a rear side in the optical axis direction.

8. The optical unit with a shake correcting function according to claim 3, wherein the welding is performed by utilizing a laser beam.

9. The optical unit with a shake correcting function according to claim 1, wherein the fixing protruded part is welded to the inner edge of the cut-out portion by utilizing a thickness of the side plate part.

10. The optical unit with a shake correcting function according to claim 1, wherein the fixing protruded part is provided at a center in a length direction of each of the two sides.

11. The optical unit with a shake correcting function according to claim 1, wherein
 the spring member is provided with
  a fixed body side connecting part which is connected with the fixed body at a position adjacent to the stopper member on a front side in the optical axis direction,
  arm parts which are extended in an "L"-shape along two of four sides from the fixed body side connecting part, and
  a movable body side connecting part which is connected with a tip end part of the arm part and is connected with the movable body,
 connected portions of the arm parts with the movable body side connecting part and connected portions of the arm parts with the fixed body side connecting part are respectively located at centers of the four sides of the stopper member, and
 a penetration part or a recessed part is formed in the stopper member at a position overlapped with the connected portion of the arm part with the fixed body side connecting part in the optical axis direction.

12. The optical unit with a shake correcting function according to claim 11, wherein a projection which is projected toward a front side in the optical axis direction is provided in the stopper member at a position overlapped with a portion adjacent to the connected portion of the arm part with the movable body side connecting part.

13. The optical unit with a shake correcting function according to claim 11,
 wherein the fixed body side connecting part of the spring member is fixed to the side plate part by welding in the cut-out portion provided in the side plate part of the rectangular tube-shaped body part so as to be overlapped with the fixing protruded part of the stopper member.

14. The optical unit with a shake correcting function according to claim 1, wherein the stopper member is provided with a mark for distinguishing a face on a front side in the optical axis direction from a face on a rear side in the optical axis direction.

15. The optical unit with a shake correcting function according to claim 1, wherein the stopper member is fixed to the fixed body.

16. The optical unit with a shake correcting function according to claim 1,
wherein the welding is performed by utilizing a laser beam.

17. The optical unit with a shake correcting function according to claim 1,
wherein a swing support point which structures the swing center of the movable body is provided between a rear side end part in the optical axis direction of the movable body and a bottom plate portion of the fixed body which faces the rear side end part of the movable body on a rear side in the optical axis direction.

* * * * *